(12) United States Patent
Oh et al.

(10) Patent No.: US 12,244,793 B2
(45) Date of Patent: Mar. 4, 2025

(54) METHOD AND APPARATUS WITH NEURAL CODEC

(71) Applicant: Samsung Electronics Co., Ltd., Suwon-si (KR)

(72) Inventors: Paul Oh, Suwon-si (KR); Suji Kim, Suwon-si (KR); Dongwon Jang, Suwon-si (KR); Seunghoon Jee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 71 days.

(21) Appl. No.: 18/351,009

(22) Filed: Jul. 12, 2023

(65) Prior Publication Data

US 2024/0187573 A1    Jun. 6, 2024

(30) Foreign Application Priority Data

Dec. 1, 2022    (KR) .................. 10-2022-0165780

(51) Int. Cl.
*H04N 19/109*    (2014.01)
*H04N 19/176*    (2014.01)
*H04N 19/57*    (2014.01)

(52) U.S. Cl.
CPC ......... *H04N 19/109* (2014.11); *H04N 19/176* (2014.11); *H04N 19/57* (2014.11)

(58) Field of Classification Search
CPC .... H04N 19/109; H04N 19/176; H04N 19/57; H04N 19/105; H04N 19/11; H04N 19/593; G06N 3/0495; G06N 3/08; G06F 17/153
USPC ................................... 375/240.12
See application file for complete search history.

(56) References Cited

U.S. PATENT DOCUMENTS 10,979,718 B2    4/2021   Chou et al.
11,240,492 B2    2/2022   Zhai et al.
11,792,424 B2 *  10/2023  Lee ..................... H04N 19/109
                                               375/240.16

(Continued)

FOREIGN PATENT DOCUMENTS

KR          10-2334390 B1        12/2021
KR          10-2022-0077096 A     6/2022
KR          10-2022-0077893 A     6/2022

OTHER PUBLICATIONS

Chadha et al. "Deep Perceptual Preprocessing for Video Coding" *Proceedings of the IEEE/CVF Conference on Computer Vision and Pattern Recognition.* 2021 (pp. 14852-14861).

*Primary Examiner* — Tung T Vo
(74) *Attorney, Agent, or Firm* — NSIP Law

(57) ABSTRACT

A neural codec includes a first simulated predictor for predicting a first block corresponding to a target block within a current frame, wherein the first block is predicted in accordance with the target block of the to-be-predicted current frame and pixels of neighbor blocks adjacent to the target block being input to the first simulated predictor, a second simulated predictor for predicting a second block corresponding to a target block using a reference block of a frame determined based on a prediction mode, wherein the second block is predicted in accordance with the reference block of a reference frame adjacent to the current frame and the target block being input to the second simulated predictor, and a selection network configured to select, based on the prediction mode, one of the first block and the second block as a predicted block.

20 Claims, 21 Drawing Sheets

(56) References Cited

U.S. PATENT DOCUMENTS

| | | | |
|---|---|---|---|
| 11,917,148 B2* | 2/2024 | Lee | H04N 19/119 |
| 2019/0281290 A1* | 9/2019 | Lee | H04N 19/119 |
| 2020/0186796 A1 | 6/2020 | Mukherjee et al. | |
| 2022/0094977 A1* | 3/2022 | Kim | H04N 19/184 |
| 2022/0385940 A1* | 12/2022 | Kang | H04N 19/577 |
| 2024/0089475 A1* | 3/2024 | Yu | H04N 19/42 |
| 2024/0163459 A1* | 5/2024 | Deng | H04N 19/176 |
| 2024/0244208 A1* | 7/2024 | Kim | H04N 19/70 |
| 2024/0244273 A1* | 7/2024 | Kim | H04N 19/124 |

* cited by examiner

FIG. 7

: Frozen network (after completion of learning)

: Non-differentiable module

METHOD AND APPARATUS WITH NEURAL CODEC

CROSS-REFERENCE TO RELATED APPLICATIONS

This application claims the benefit under 35 USC § 119(a) of Korean Patent Application No. 10-2022-0165780, filed on Dec. 1, 2022, in the Korean Intellectual Property Office, the entire disclosure of which is incorporated herein by reference for all purposes.

BACKGROUND

1. Field

The following description relates a method and apparatus with a neural codec.

2. Description of Related Art

Various methods using artificial intelligence (AI) are being used to improve the performance of standard codecs. Various methods may include, for example, receiving an output of a standard codec as an input and improving the performance of the standard codec through post-processing, transforming an input image of a standard codec to improve a compression rate or to increase subjective image quality, adding a pre-filter, adding a down-sampler and/or up-sampler before and after a standard codec for scalable video coding (SVC), or adding a mode decision network that optimizes parameters of a standard codec. However, other than the improving performance of a standard codec through post-processing, the result of the neural network is used as an input of the standard codec, and the deterioration of an image when compressed by a standard codec is not discernible, so learning of a neural network has not been possible.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a neural codec includes a first simulated predictor for predicting a first block corresponding to a target block within a current frame, wherein the first block is predicted in accordance with the target block of the to-be-predicted current frame and pixels of neighbor blocks adjacent to the target block being input to the first simulated predictor, a second simulated predictor for predicting a second block corresponding to a target block using a reference block of a frame determined based on a prediction mode, wherein the second block is predicted in accordance with the reference block of a reference frame adjacent to the current frame and the target block being input to the second simulated predictor, and a selection network configured to select, based on the prediction mode, one of the first block and the second block as a predicted block.

The first simulated predictor may generate first candidate blocks by referring to the pixels of the neighbor blocks in the current frame, and may include a first network for selecting one of the first candidate blocks as the first block based on a difference between the first candidate blocks and the target block.

The first simulated predictor may generate an intra-frame vector by replicating the pixels of the neighbor blocks in a vertical direction, and generate the first candidate blocks by a matrix multiplication between the intra-frame vector and predefined intra-frame matrices.

The first network may include a first classification network for outputting a one-hot-vector corresponding to any one of the first candidate blocks based on the difference between the first candidate blocks and the target block, and a first computation module for selecting the first block by performing a channel-wise multiplication between the one-hot-vector and the first candidate blocks.

The reference block may have a size greater than the target block by the size of a search range.

The second simulated predictor may include a second network for generating a motion kernel based on a comparison result between the reference block and the target block, and a convolution operation module for outputting a candidate area having the highest similarity with the target block among candidate areas of the reference block as the second block, wherein the candidate areas is output based on a convolution operation between the motion kernel and the reference block.

The second network may generate a latent vector based on the target block and the reference block, and generate the motion kernel according to the size of a search range using the latent vector.

When the prediction mode is a P-frame prediction mode, the second network may generate the motion kernel in a one-hot-vector form based on the reference block of the reference frame.

When the prediction mode is a B-Frame prediction mode, the reference block may include reference blocks of a plurality of frames, and the second network may generate the motion kernel having one or more non-zero values based on the reference blocks.

The selection network may include a second classification network for outputting one-hot-vectors corresponding to probability distributions based on differences between each of the first block and the second block, and the target block, and a second computation module for selecting one of the first block and the second block as the predicted block by performing a channel-wise multiplication between each of the first block and the second block, and the one-hot-vectors.

When the prediction mode is the P-frame prediction mode or the B-Frame prediction mode, the selection network may output the one block selected from the first block and the second block as the predicted block, and when the prediction mode is an I-frame prediction mode, the selection network may output the first block as the predicted block without performing the channel-wise multiplication.

The reference block may include a plurality of reference blocks, and the second simulated predictor may generate second candidate blocks having the same size as the target block by unfolding the plurality of reference blocks, and predict a second block corresponding to the target block by arranging the second candidate blocks in a channel direction and applying the second candidate blocks as an input to a third network, and the third network may select one of the second candidate blocks as the second block based on a difference between the second candidate blocks and the target block.

The neural codec may be added to a front-end or back-end of a standard codec, and when the neural codec is added to the front-end or back-end of the standard codec, the neural codec may enable learning of the standard codec without changing parameters of networks included in the neural codec.

In another general aspect, a neural codec includes a first simulated predictor for generating first candidate blocks by referring to a target block of a to-be-predicted current frame, and pixels of neighbor blocks adjacent to the target block, a second simulated predictor for generating second candidate blocks having the same size as the target block by unfolding reference blocks of a reference frame adjacent to the current frame, a combination module for generating combined blocks acquired by concatenating the first candidate blocks and the second candidate blocks, and a selection network for selecting one of the combined blocks as a predicted block based on a difference between the combined blocks and the target block.

In another general aspect, a learning method of a neural codec including a first simulated predictor, a second simulated predictor, and a selection network includes training a first network of the first simulated predictor to predict a first block corresponding to a target block within a learning frame, in accordance with the target block of the to-be-predicted learning frame and pixels of neighbor blocks adjacent to the target block being input, training a second network of the second simulated predictor to predict a second block corresponding to a target block using a reference block selected based on a prediction mode, in accordance with the reference block of a reference frame adjacent to the learning frame and the target block being input, and training the selection network to select one of the first block and the second block as a predicted block based on the prediction mode.

The training of the first network may include training the first network based on a first loss between the first block, which is selected from among first candidate blocks by a difference between the first candidate blocks generated by referring to the pixels of the neighbor blocks adjacent to the target block and the target block, and the target block.

The training of the first network may include training the first network to predict the first block by further considering a second loss between a first one-hot-vector output corresponding to any one of the first candidate blocks based on the difference between the first candidate blocks and the target block, and a second one-hot-vector based on a difference between blocks in the learning frame and the target block.

The training of the second network may include generating a motion kernel according to the prediction mode based on a comparison result between the reference block and the target block, and training the second network to predict the second block based on a first loss between candidate areas of the reference block generated through a convolution operation between the motion kernel and the reference block, and the target block.

The training of the second network may include training the second network to predict the second block by further considering a second loss between the motion kernel generated according to the prediction mode and a ground truth motion kernel corresponding to the target block, based on the comparison result between the target block and the reference block.

Other features and aspects is apparent from the following detailed description, the drawings, and the claims.

BRIEF DESCRIPTION OF THE DRAWINGS

FIG. 7 illustrates an example of intra vectors and intra matrices used in a first simulated predictor, according to one or more embodiments.

Figure 1:
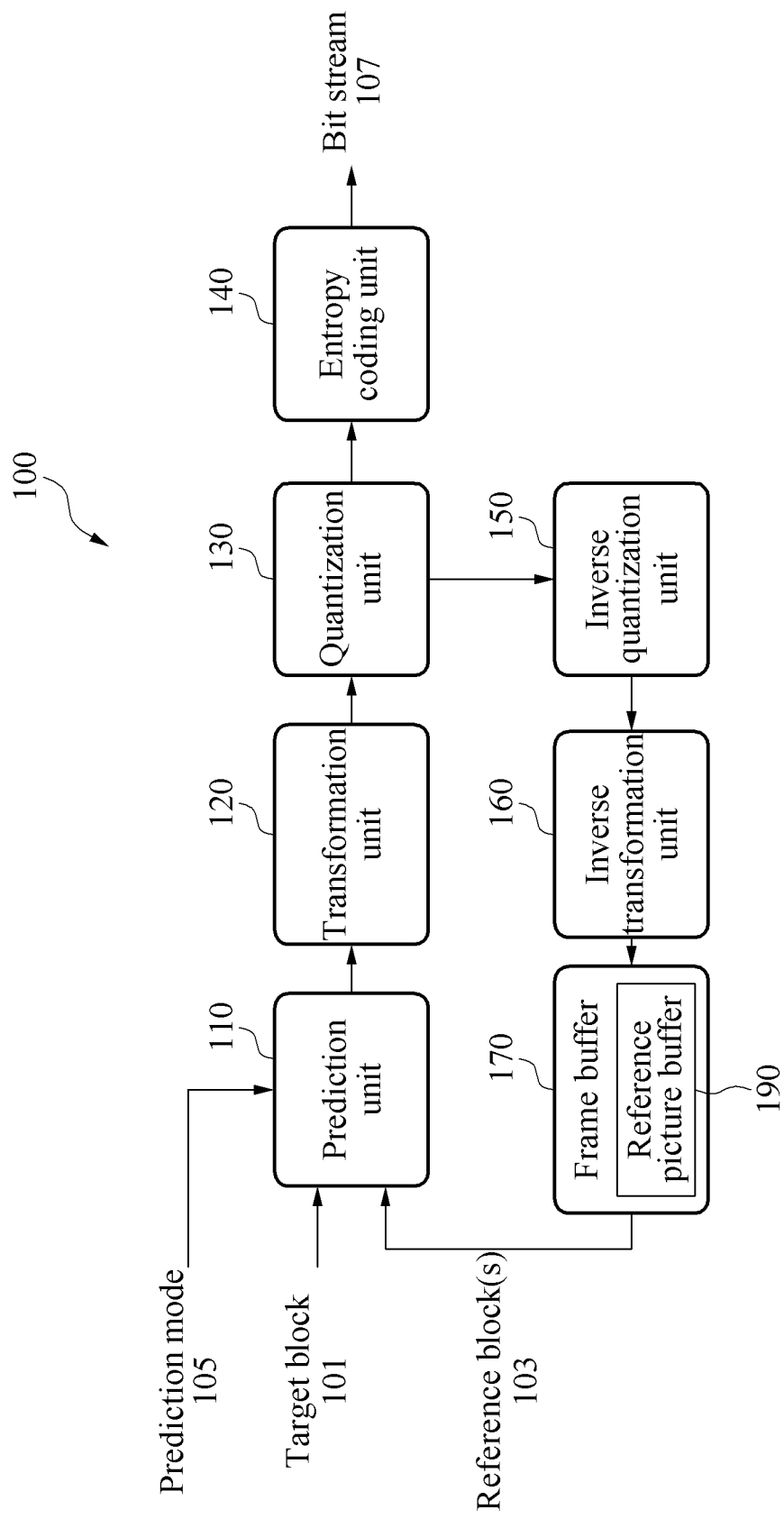
FIG. 1 illustrates an example structure of a video codec simulation network, according to one or more embodiments.

Throughout the drawings and the detailed description, unless otherwise described or provided, the same or like drawing reference numerals is understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein is apparent after an understanding of the disclosure of this application. For example, the sequences of operations described herein are merely examples, and are not limited to those set forth herein, but may be changed as is apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that is apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

FIG. 1 illustrates an example structure of a video codec simulation network, according to one or more embodiments.

Referring to FIG. 1, a video codec simulation network 100 may include a prediction unit 110, a transformation unit 120, a quantization unit 130, an entropy coding unit 140, an inverse quantization unit 150, an inverse transformation unit 160, and a frame buffer 170.

The video codec simulation network 100 may perform encoding (or decoding) on a target image (e.g., a current frame) using an intra-frame mode and/or an inter-frame mode. The target image may be a target for encoding and/or decoding. Also, the target image may be an input image inputted to an encoding device or a decoding device. In addition, the video codec simulation network 100 may generate a bit stream 107 including information on encoding by encoding or decoding the target image, and may output the generated bit stream 107. The generated bit stream 107 may be stored in a computer-readable storage medium or may be streamed through a wired/wireless transmission medium.

A to-be-predicted target block 101, one or more reference blocks 130 that are reference targets for inter-frame prediction, and a prediction mode 105 may be input to the video codec simulation network 100.

The "target block" 101 may be an encoding target block that is a to-be-predicted target for encoding and/or a decoding target block that is a to-be-predicted target for decoding (going forward, decoding is mainly described, however, such description is generally applicable to encoding and description of same is therefore omitted at times). The target block 101 may be a target of current encoding and/or decoding. Hereinafter, the terms "target block" and "current block" have the same meaning and are used interchangeably.

The reference block(s) 103 may be image block(s) of a reference frame referred to by the prediction unit 110 for inter-frame prediction or motion compensation. As described in more detail below, the reference block(s) 103 may be image block(s) of a reference frame on which encoding and/or decoding processing has been completed.

The prediction mode 105 may be an input parameter indicating which scheme prediction scheme is to be used by the prediction unit 110 to predict a predicted block. The prediction mode may indicate whether an I-frame prediction mode, a P-frame prediction mode, and/or a B-frame prediction mode is/are to be performed when the prediction unit 110 predicts a predicted block. The I-frame prediction mode, P-frame prediction mode, and/or B-frame prediction mode are further described with reference to FIG. 10.

The prediction unit 110 may generate (predict) a predicted block corresponding to the target block 101 of the current to-be-predicted frame. In addition, the video codec simulation network 100 may encode the target block 101 and a residual of the predicted block after the predicted block is generated.

The prediction mode 105 of a coding unit may be, for example, any one or any combination of an intra-frame mode and an inter-frame mode, but is not limited thereto. When encoding (or decoding) a stream of coding units (e.g., blocks or frames), in some implementations, the video codec simulation network may dynamically change its prediction mode 105 according to current/recent conditions. For example, the video codec simulation network 100 may select the prediction mode 105 having the smallest coding error by performing a prediction on each coding unit (e.g., block or frame).

Regarding the general nature of the modes of the prediction mode 105, when the prediction mode 105 is in an intra-frame mode, the prediction unit 110 may use pixels of neighbor blocks around the target block 101 that have already been encoded/decoded to perform spatial prediction on the target block 101 and generate predicted blocks corresponding to the target block 101 using spatial prediction. "Neighbor blocks" may be blocks adjacent to and/or within a predetermined distance of the target block 101. In other word, a neighbor block may be a block adjacent to (or near) the target block 101 and may have already been encoded and/or decoded.

Further regarding the modes of the prediction mode 105, when the prediction mode 105 is an inter-frame mode, the prediction unit 110 may search for an area that most closely matches the target block 101 among the reference block(s) 103 in a motion prediction process and may derive a motion vector for the target block 101 and the searched area using content of the searched area. In this example, the reference block(s) 103 may be stored in the frame buffer 170 (i.e., may be blocks of a previous frame).

The transformation unit 120 may generate a transform coefficient by performing a transform on a residual block; the transformation unit 120 may output the thus-generated generated transform coefficient. The transform coefficient may be a coefficient value generated by performing a transform on a residual block.

The transformation unit 120 may use one of multiple predefined transform methods to perform the transform. The transform methods may include the discrete cosine transform (DCT), the discrete sine transform (DST), and the Karhunen-Loeve transform (KLT), as non-limiting examples.

The quantization unit 130 may generate a quantized transform coefficient level (i.e., a quantized level or a quantized coefficient) by quantizing transform coefficients according to a quantization parameter. The quantization unit 130 may output the generated quantized transform coefficient levels (quantized coefficients). Here, the quantization unit 130 may quantize the transform coefficients using a quantization matrix.

The entropy coding unit 140 may generate the bit stream 107 by performing entropy coding according to a probability distribution based on values calculated by the quantization unit 130 and/or coding parameter values calculated in the encoding process.

The entropy coding unit 140 may output the generated bit stream 107.

The entropy coding unit 140 may perform entropy coding on information about pixels of an image/frame and information for decoding an image/frame. For example, the information for decoding an image/frame may include a syntax element.

When the entropy coding is applied, a small number of bits may be allocated (as a code) to a symbol having a high probability of occurrence, and a large number of bits may be allocated (as a code) to a symbol having a low probability of occurrence. As the symbols are represented through the allocation of such codes, the size of bit strings including the encoded symbols (encoding targets) may be reduced. Therefore, the compression performance of image encoding may be improved through entropy coding.

In addition, the entropy coding unit 140 may use entropy encoding methods such as, for example, Exponential-Golomb coding, context-adaptive variable length coding (CAVLC), and context-adaptive binary arithmetic coding (CABAC), which are non-limiting examples. For example, the entropy coding unit 140 may perform entropy coding using a variable length coding/code (VLC) table. For example, the entropy coding unit 140 may derive a binarization method for a target symbol. Also, the entropy coding unit 140 may derive a probability model of a target symbol/bin.

The entropy coding unit 140 may perform arithmetic coding using the derived binarization method, probability model, and context model.

The entropy coding unit 140 may change a coefficient of a two-dimensional (2D) block form into a one-dimensional (1D) vector form through a transform coefficient scanning method in order to encode the quantized transform coefficient level.

The transform coefficients quantized by the quantization unit 130 and coded by the entropy encoding unit 140 may be output from the entropy coding unit 140 as the bit stream 107.

Since, in the inter-frame mode, the video codec simulation network 100 performs encoding through inter-frame prediction, the encoded target image may be used as a reference image for other image(s) to be processed later.

Accordingly, the video codec simulation network 100 may reconstruct or decode the encoded target image (prior to entropy coding thereof) and store the reconstructed or decoded image in a reference picture buffer 190 as a reference image for a next target image. For such decoding/reconstruction, inverse quantization (by the inverse quantization unit 150) and inverse transformation (by the inverse transformation unit 160) may be performed on the encoded target image for decoding thereof.

The quantized level (quantized transform coefficient levels, i.e., the quantized coefficients) of the reference image in the reference picture buffer 190 may be inversely quantized in the inverse quantization unit 150 and inversely transformed in the inverse transformation unit 160. The inverse quantization unit 150 may generate inverse quantized coefficients by performing inverse quantization on the quantized levels/coefficients. The inverse transformation unit 160 may generate a reconstructed residual block by performing an inverse transform on the inverse quantized coefficients. In other words, the reconstructed residual block may be an inverse quantized and inverse transformed coefficient.

The inverse quantized and inverse transformed coefficient may be summed with the predicted block through an adder (not shown). A reconstructed block may be generated by adding the inverse quantized and/or inverse transformed coefficient and the predicted block. Here, the inverse quantized and/or inverse transformed coefficient may refer to a coefficient on which any one or any combination of dequantization and inverse-transformation has been performed and may also refer to a reconstructed residual block.

The reconstructed block may pass through a filter unit (not shown). The filter unit may apply any one of, or any combination of, a deblocking filter, a sample adaptive offset (SAO), an adaptive loop filter (ALF), and a non-local filter (NLF) to a reconstructed block or reconstructed picture. The filter unit may be referred to as an in-loop filter.

The deblocking filter may remove block distortion generated at a boundary between blocks. In order to determine whether to apply the deblocking filter, it may be determined whether to apply the deblocking filter to the target block 101 based on pixel(s) included in several columns or rows included in the block (e.g., border-area pixels).

When the deblocking filter is applied to the target block 101, the applied filter may vary according to the strength of the required deblocking filtering. In other words, among different filters, a filter determined according to the strength of the deblocking filtering may be applied to the target block 101. When the deblocking filter is applied to the target block 101, one of a strong filter and a weak filter may be applied to the target block 101 according to the strength of the required deblocking filtering. Also, when vertical filtering and horizontal filtering are performed on the target block 101, the horizontal filtering and vertical filtering may be processed in parallel.

The frame buffer 170 may store a reconstructed block or a reconstructed image in the reference picture buffer 190.

Figure 2:
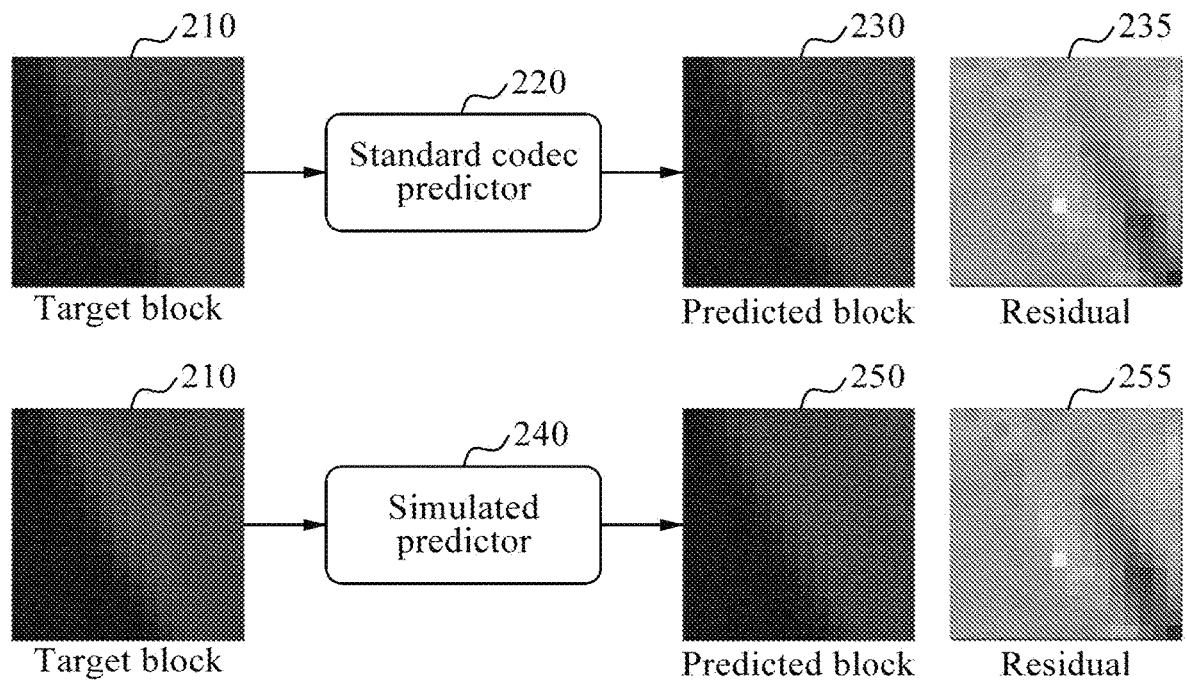
FIG. 2 illustrates an example prediction result of a standard codec and a prediction result of a neural codec, according to one or more embodiments.

FIG. 2 illustrates an example prediction result of a standard codec and a prediction result of a neural codec, according to one or more embodiments. Referring to FIG. 2, a predicted block 230 and a residual 235 predicted with respect to the target block 210 by intra-frame prediction of a standard codec predictor 220, and a predicted block 250 and a residual 255 predicted with respect to the target block 210 by a simulated predictor 240 which simulates the standard codec predictor 220 are illustrated.

The simulated predictor 240 may not necessarily be intended or configured to output a better result than the standard codec predictor 220, but rather may be configured to output a result that is as close as possible (nearly identical) to a corresponding result of the standard codec predictor 220. The simulated predictor 240 may be placed in/at the front-end of a standard codec to predict a change of a compression result by the standard codec after an image and control parameters for compression are processed by a neural network for compression improvement. In addition, the simulated predictor 240 may enable backpropagation of a gradient during learning so that weight parameters of the neural network for compression improvement may be optimized.

The simulated predictor 240 may be configured with a structure including a differentiable neural network. The simulated predictor 240 may output the same (or nearly) prediction result as that of the standard codec (for a same target block) by networking non-differentiable intra-frame prediction and inter-frame prediction of the standard codec. The simulated predictor 240 may correspond to a neural codec 300 illustrated in FIG. 3 as described below.

Figure 3:
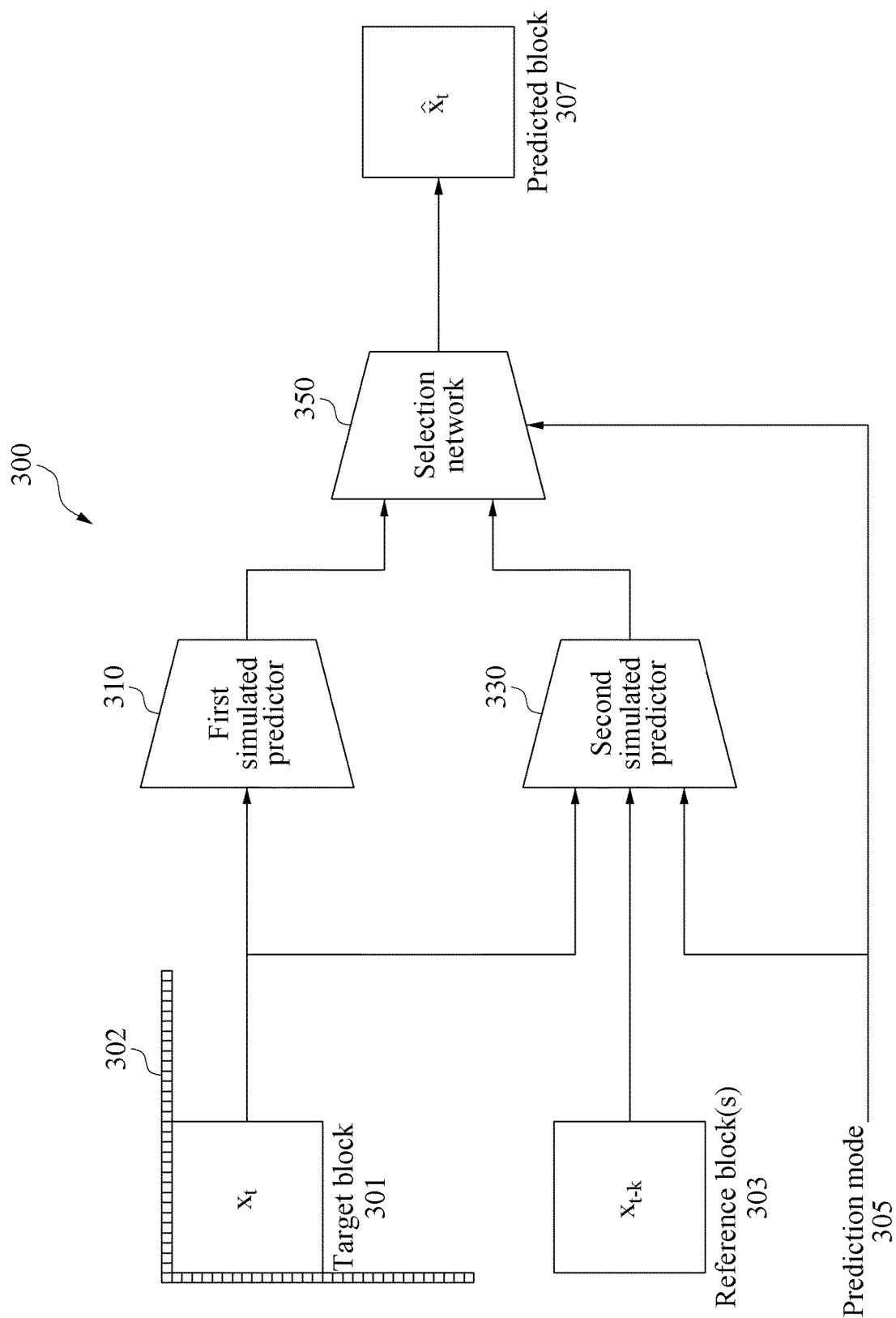
FIG. 3 illustrates an example neural codec, according to one or more embodiments.

FIG. 3 illustrates an example neural codec, according to one or more embodiments. Referring to FIG. 3, a neural codec 300 may include a first simulated predictor 310, a second simulated predictor 330, and a selection network 350. The neural codec 300 may correspond to, for example, the prediction unit 110 illustrated in FIG. 1, but is not limited thereto.

The neural codec 300 may include, for example, a neural network simulating a predictor (e.g., the prediction unit 110 of FIG. 1) that performs intra-frame prediction and inter-frame prediction in a network (e.g., the video codec simulation network 100 of FIG. 1) that simulates a standard codec.

Prior to describing a prediction operation of the neural codec 300, a neural network is briefly described. A neural network may be referred to in brief as a "network".

The neural network may correspond to a recognition model, for example, implemented with instructions and/or hardware that performs inferences by using layers of interconnected nodes. Such nodes are connected to each other and may operate collectively to process input data.

The neural network may include an input layer, a hidden layer, and an output layer. The input layer may receive an input for performing learning and may transform and transmit the input to the hidden layer. The output layer may generate an output of the neural network based on a signal received from nodes of the hidden layer. The hidden layer may be located between the input layer and the output layer and may perform inferences on training data received via the input layer to prediction values. Nodes included in the input layer and the hidden layer may be connected to each other through connections having respective connection weights. Nodes included in the hidden layer and the output layer may also be connected to each other through connection lines having respective connection weights. Each of the input layer, the hidden layer, and the output layer may include a respective plurality of nodes.

The neural network may include a plurality of hidden layers. The neural network including a plurality of hidden layers may be referred to as a "deep neural network (DNN)". Training of the DNN may be referred to as deep learning. A node included in the hidden layer may be referred to as a "hidden node".

The DNN may have, for example, a multilayer perceptron structure including a plurality of hidden layers. "Perceptron" may be a term referring to the mathematical model $y=Wx+b$ of each neuron. Prediction accuracy of the multilayer perceptron may be increased via learning by a backpropagation algorithm.

A method of how the DNN is trained via the backpropagation algorithm is described below. When the DNN starts from an input layer and obtains an output value y via an output layer, a difference between the output value y and a reference label value is transferred to the output layer in the direction of the input layer, and each weight W and bias b value of the nodes may be updated according to a calculated cost. The reference label may be, for example, data indicating ground truth or data having the smallest error from the original data.

As described above, when learning is performed by applying a predetermined input/output data set, the DNN may learn a data pattern of the input/output data set in high-dimensionality to generate a model that infers a predicted output most similar to the original data. The DNN may be, for example, a convolutional neural network (CNN), a recurrent neural network (RNN), a deep belief network (DBN), and/or a restricted Boltzmann machine (RBM) model, but is not limited thereto. The DNN may include a combination of at least one of the aforementioned networks.

Returning to the neural codec 300, the first simulated predictor 310 may predict a first block corresponding to a target block $x_t$ 301 within a current frame in accordance with the target block 301 of the current to-be-predicted frame and pixels 302 of neighbor blocks adjacent to the target block 301 that is being inputted. The configuration and operation of the first simulated predictor 310 is further described with reference to FIGS. 4 to 8. The first simulated predictor 310 may perform intra-frame prediction within the current frame. Intra-frame prediction is further described with reference to FIG. 5.

Data input to the first simulated predictor 310 may be the target block (e.g., a current block) 301 subjected to intra-frame prediction and pixel values of the pixels 302 of the neighbor blocks adjacent to (or near) the target block 301. The pixel values of the pixels 302 of the neighbor blocks may correspond to pixel values of blocks left-of/above the target block 301 (encoding or decoding having been completed for such left-of/above neighbor blocks). For example, when pixel values cannot be referred to because there are no left-of/above neighbor blocks of the target block 301, the first simulated predictor 310 may set the pixel values of the pixels 302 of the neighbor blocks as constant values in the same way as in a standard codec policy or may set the pixel values to some other referenceable pixel values. A positional relationship between the target block 301 and neighbor blocks is described with reference to FIG. 6.

Data output from the first simulated predictor 310 may be a block predicted by minimizing an error with the target block 301, that is, a first block (e.g., a first block 460 of FIG. 4) predicted for, and corresponding to, the target block 301.

The first simulated predictor 310 may include a neural network (e.g., a first network 450 of FIG. 4) trained to select and output an intra-frame prediction result having the smallest distortion loss among intra-frame prediction results of various encoding/decoding modes. The distortion loss may be computed by, a sum of difference (SAD), mean absolute error (MAE), and mean square error (MSE), as non-limiting examples. An output of the first simulated predictor 310 may be a block (a "first block") corresponding to an intra-frame prediction result that minimizes distortion loss among intra-frame prediction results of various modes (see, e.g., first candidate blocks 430 in FIG. 4).

The second simulated predictor 330 may predict a second block corresponding to the target block 301 using a reference block $x_{t-k}$ 303 of a determined frame selected based on a prediction mode 305. The second simulated predictor 330 may predict the second block in accordance with the reference block 303 based on a previous frame of the current frame and the target block 301 that is being inputted. The number of reference blocks 303 may be one or more. The reference block 303 may have a size (dimension) greater than a size of the target block 301 by the size of a search range, but is not limited thereto. A "search range" may be a 2D area in which a search for a motion kernel or a motion vector is performed during inter-frame prediction. The size of the search range may be, for example, 2M×2M, and M may be a positive integer.

The second simulated predictor 330 may generate a motion kernel according to a prediction mode and based on a comparison result between the target block 301 and one or more reference blocks 303. The second simulated predictor 330 may output a block (a "second block", e.g., a second block 940 of FIG. 9) corresponding to an inter-frame prediction result through a convolution operation between the motion kernel and the reference block 303.

The second simulated predictor 330 may include a network (e.g., a second network 910 of FIG. 9) trained to select and output an inter-frame prediction result having the smallest distortion loss among several candidate areas in the reference block 303. The configuration and operation of the second simulated predictor 330 is further described with reference to FIGS. 9 to 11.

The second simulated predictor 330 may perform inter-frame prediction between multiple frames. Inter-frame prediction is further described with reference to FIG. 10.

Input data of the second simulated predictor 330 may be the target block 301, the reference block(s) 303 referred to by the target block 301, and the prediction mode 305. The reference block(s) 303 may correspond to, for example, blocks of a previous frame corresponding to the past of (i.e., behind) the current frame and/or blocks of a subsequent frame corresponding to the future of (i.e., ahead of) the current frame. Data output from the second simulated predictor 330 may be a block predicted by minimizing an error with the target block 301, that is, a second block predicted for, and corresponding to, the target block 301.

As described above, when prediction is performed using a DNN trained to generate a predicted block that minimizes an error with the target block 301 corresponding to the original data, encoding and decoding may be performed by an image encoding device and an image decoding device without requiring transmission of prediction information (e.g., prediction mode, reference picture index, and the like).

The selection network 350 may select between the first block and the second block as a predicted block x 307, and the selection may be based at least in part on the prediction mode 305. The selection network 350 may include a neural network trained to select, as the predicted block 307, a block having the smallest distortion loss among the first block (the intra-frame prediction result) and the second block (the inter-frame prediction result). The configuration and operation of the selection network 350 is further described with reference to FIG. 12.

Figure 4:
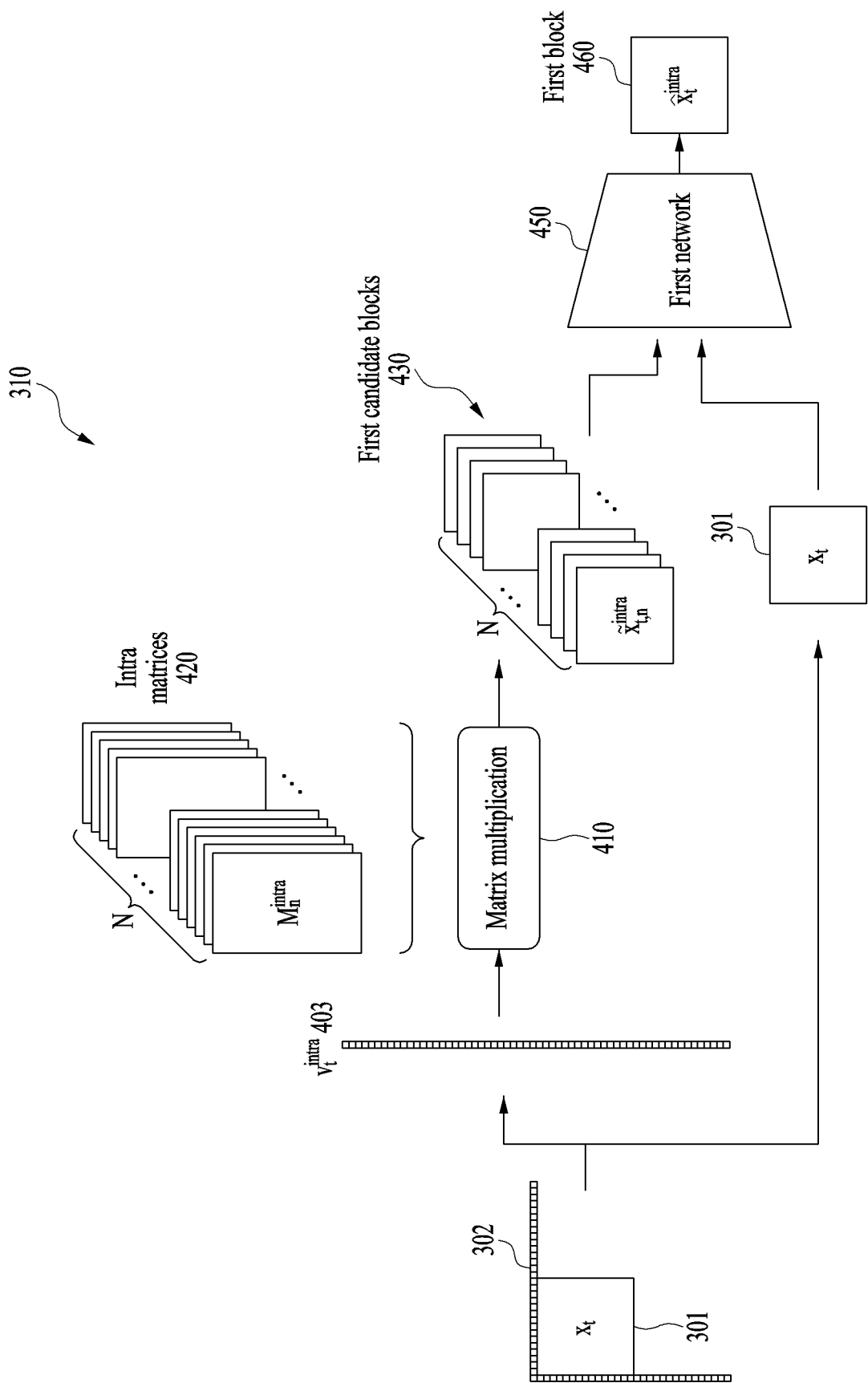
FIG. 4 illustrates an example operation of a first simulated predictor, according to one or more embodiments.

FIG. 4 illustrates an example operation of a first simulated predictor, according to one or more embodiments. Referring to FIG. 4, the first simulated predictor 310 may generate first candidate blocks $\tilde{x}_{t,n}^{intra}$ 430 by referring to the pixels 302 of neighbor blocks adjacent to the target block 301 in a current frame. The first simulated predictor 310 may include the first network 450 that selects one of the first candidate blocks 430 as the first block $\hat{x}_t^{intra}$ 460 based on a difference between the first candidate blocks 430 and the target block 301.

For example, the first simulated predictor 310 may replicate the left-of/above pixels 302 of the neighbor blocks adjacent to (or near) the target block 301 in a vertical direction to generate an intra-frame vector $v_t^{intra}$ 403. The first simulated predictor 310 may arrange the left-of/above pixels of vertical/horizontal directions of the neighbor blocks in one vector form, such as the intra-frame vector 403. The intra-frame vector 403 may be a 1D vector and may be expressed by, for example, Equation 1.

$$v_t^{intra} = \begin{bmatrix} x_t(-1, -1) \\ \vdots \\ x_t(2K-1, -1) \\ x_t(-1, 0) \\ \vdots \\ x_t(-1, 2K-1) \end{bmatrix} \quad \text{Equation 1}$$

The first simulated predictor 310 may generate N first candidate blocks 430 by a matrix multiplication 410 between the intra-frame vector 403 and N predefined intra-frame matrices $M_n^{intra}$ 420. The N first candidate blocks 430 may be blocks located at positions different from the position of the target block 301 in the current frame.

Here, N may correspond to the number of intra-frame matrices corresponding to an intra-frame prediction mode. For example, since HEVC, one of the standard codecs, has a total of 35 intra-frame prediction modes, when N=35. The intra-frame prediction mode is described with reference to FIG. 5.

Figure 7:
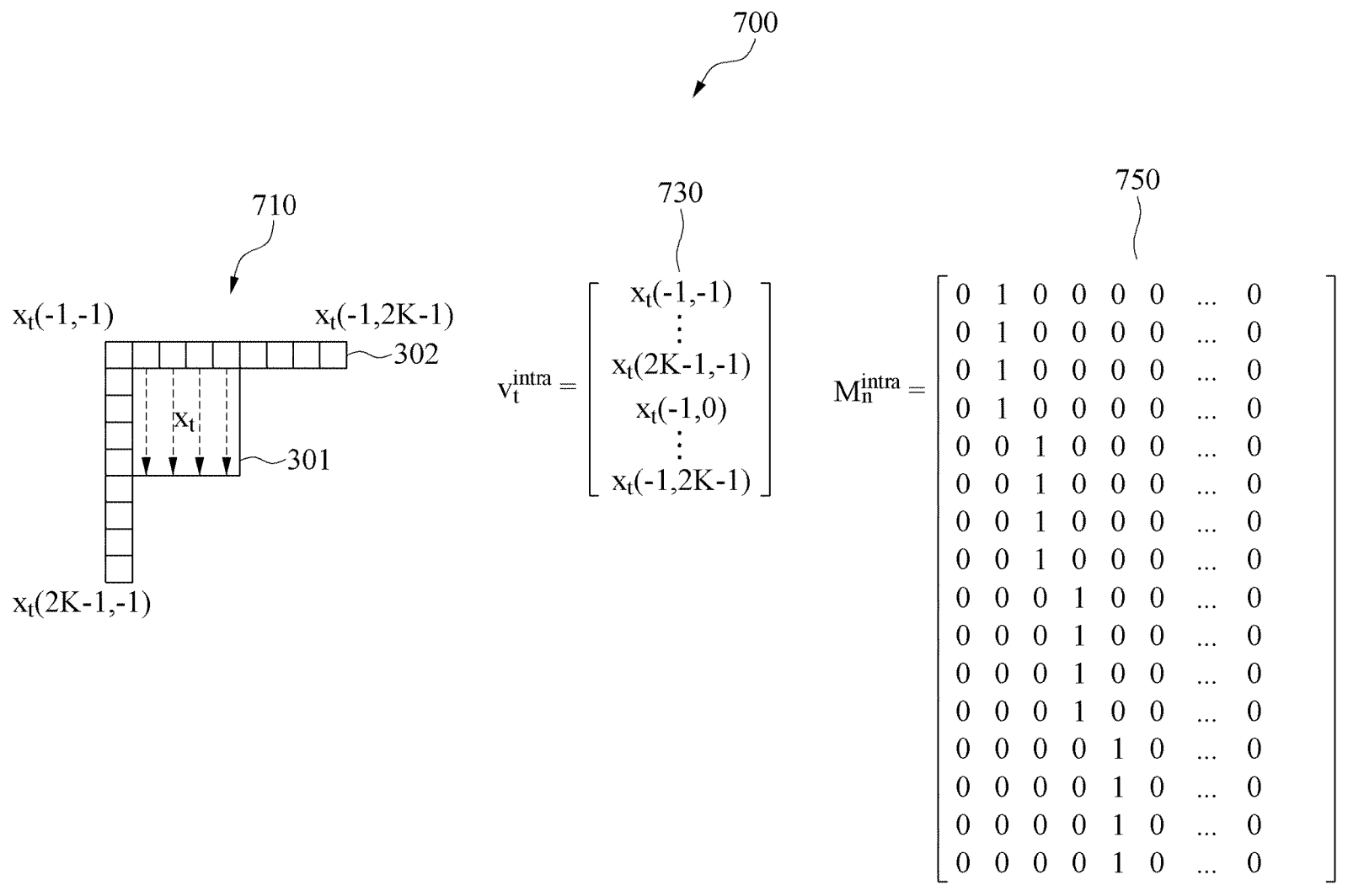

For an example configuration of the intra-frame matrices 420 defined when the size of the target block 301 is 4×4, that is, when K=4, refer to FIG. 7.

Figure 5:
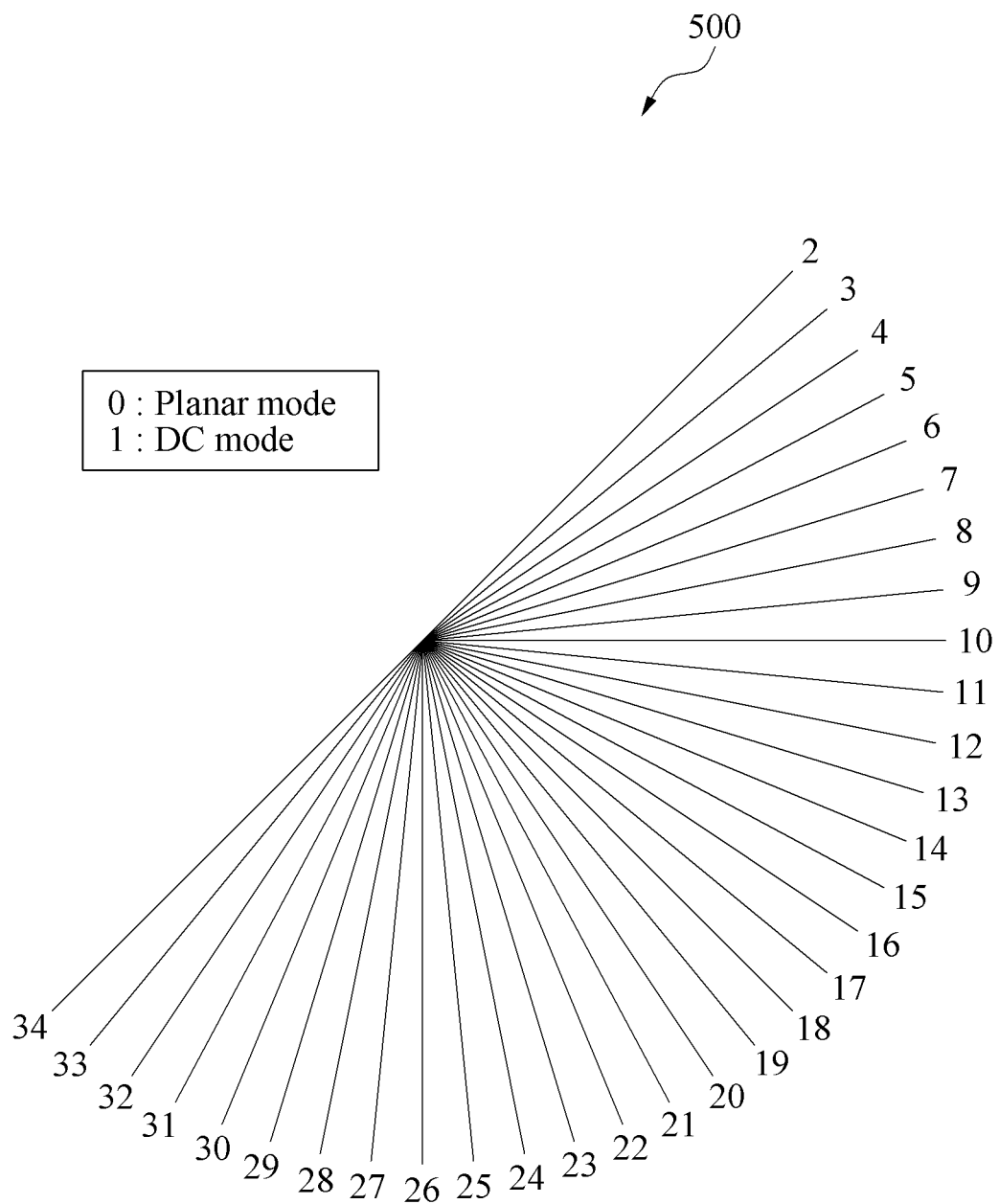
FIG. 5 illustrates an example prediction process of a first block, according to one or more embodiments.

FIG. 5 illustrates an example prediction process of a first block, according to one or more embodiments. Referring to FIG. 5, a graph 500 that shows an intra-frame prediction process of the first simulated predictor 310.

"Intra-frame prediction" is a prediction technique using spatial reference and refers to predicting a target block using pixels of neighbor block(s) adjacent to (or near) the to-be-predicted target block.

Intra-frame prediction, such as intra-frame encoding and/or intra-frame decoding, may be performed using the pixels of neighbor blocks positioned around/near a target block.

The neighbor blocks may be positioned around the target block and reconstructed by encoding or decoding.

The first simulated predictor 310 may perform intra-frame prediction based on pixel information of the neighbor blocks adjacent to the target block in a to-be-predicted target image (e.g., the current frame), to predict a first block corresponding to the target block. When the intra-frame prediction is performed, the first simulated predictor 310 may perform directional prediction and/or non-directional prediction based on at least one reconstructed neighbor block.

The "first block" may be generated as a result of performing intra-frame prediction. The first block may be in the form of, for example, a square having a size of 2N×2N or a size of N×N. A size of N×N may include, for example, 4×4, 8×8, 16×16, 32×32, and 64×64. The first block may be a square block having a size of, for example, 2×2, 4×4, 8×8, 16×16, 32×32, or 64×64, or a rectangular block having a size such as 2×8, 4×8, 2×16, 4×16, and 8×16, but is not limited thereto.

In the graph 500 of FIG. 5, the lines drawn from the center to the periphery represent prediction directions of the intra-frame prediction modes. Also, the numbers displayed adjacent to each of the lines may indicate an example of a mode value assigned to an intra-frame prediction mode or a prediction direction of the intra-frame prediction mode.

The intra-frame prediction may be performed according to an intra-frame prediction mode for a target block.

The intra-frame prediction mode may include a non-directional mode and a directional mode. As illustrated in FIG. 5, the intra-frame prediction mode may include two non-directional modes and 33 directional modes.

The two non-directional modes may include, for example, a direct current (DC) mode and a planar mode. For example, a mode value of the DC mode may be 1, and a mode value of the planar mode may be 0.

When the intra-frame prediction mode is in the DC mode, the first simulated predictor 310 may generate the first block using an average value of the pixels of the left/above neighbor blocks adjacent to the target block. A positional relationship between the target block and the neighbor blocks is described with reference to FIG. 6.

When the intra-frame prediction mode is in the planar mode, the first simulated predictor 310 may generate the first block using a weighted sum of the pixels corresponding to the above, left, right-above, and left-below of a target pixel among the pixels of the neighbor blocks according to a position of the target pixel.

Among the intra-frame prediction modes, modes other than the DC mode and the planar mode may be directional modes. A directional mode may correspond to a method of obtaining pixels by considering direction when predicting a first block from the pixels of neighbor blocks.

The directional modes may include angular modes with predetermined directions or a predetermined angles from mode value 2 to 34. Each directional mode may have a different direction, for example, a vertical mode, horizontal mode, diagonal mode, diagonal down-left mode, diagonal down-right mode, vertical right mode, vertical left mode, horizontal-up mode, horizontal-down mode, and so forth. The first block may be generated via intra-frame prediction when the prediction mode is in a directional mode, which expands the values of neighboring pixels in a predetermined direction corresponding the directional mode.

When the intra-frame prediction mode is in a directional mode, the first simulated predictor 310 may predict the first block using pixels adjacent to the above, left, right-above, and/or left-below of the target block among the pixels of the neighbor blocks.

The intra-frame prediction mode of the target block may be predicted from, for example, the intra-frame prediction mode of the neighbor blocks of the target block, and in this case, information used for prediction may be entropy encoded/decoded.

The intra-frame prediction mode may be expressed as any one of, or any combination of, a mode number, a mode value, and/or a mode angle. The number of intra-frame prediction modes may be M (1 or more) including the number of non-directional modes and/or the number of directional modes.

The number of intra-frame prediction modes that the target block may have may be a predefined fixed value or a value determined according to the attributes of the first block. The attributes of the first block may include, for example, a size of the first block and/or a type of the first block.

For example, the number of the intra-frame prediction modes may be fixed to 35 regardless of the size of the first block. Alternatively, the number of the intra-frame prediction modes may be, for example, 3, 5, 9, 17, 34, 35, or 36.

The number of the intra-frame prediction modes may be fixed to M regardless of the size and/or color components of the block. For example, the number of the intra-frame prediction modes may be fixed to either 35 or 67 regardless of the size of the block.

Alternatively, the number of the intra-frame prediction modes may be different according to a size and/or type of the color components of the block. For example, the number of the intra-frame prediction modes may increase as the block size increases. Alternatively, the number of the intra-frame prediction modes may decrease as the block size increases.

For example, when the target block is the first block of a corresponding frame, the pixels included in neighbor blocks reconstructed to perform intra-frame prediction may not exist, or the pixels included in neighbor blocks may be difficult to use for the target block. In this case, the first simulated predictor 310 may fill a pixel value of the first block with a value obtained by copying at least one pixel value among the pixels included in the reconstructed neighbor block or a pixel value generated by interpolation.

The number of the intra-frame prediction modes and the mode value of each intra prediction mode described above may be merely illustrative. The number of the intra-frame prediction modes and the mode value of each intra-frame prediction mode described above may be defined differently according to examples, implementations, and/or as necessary.

Figure 6:
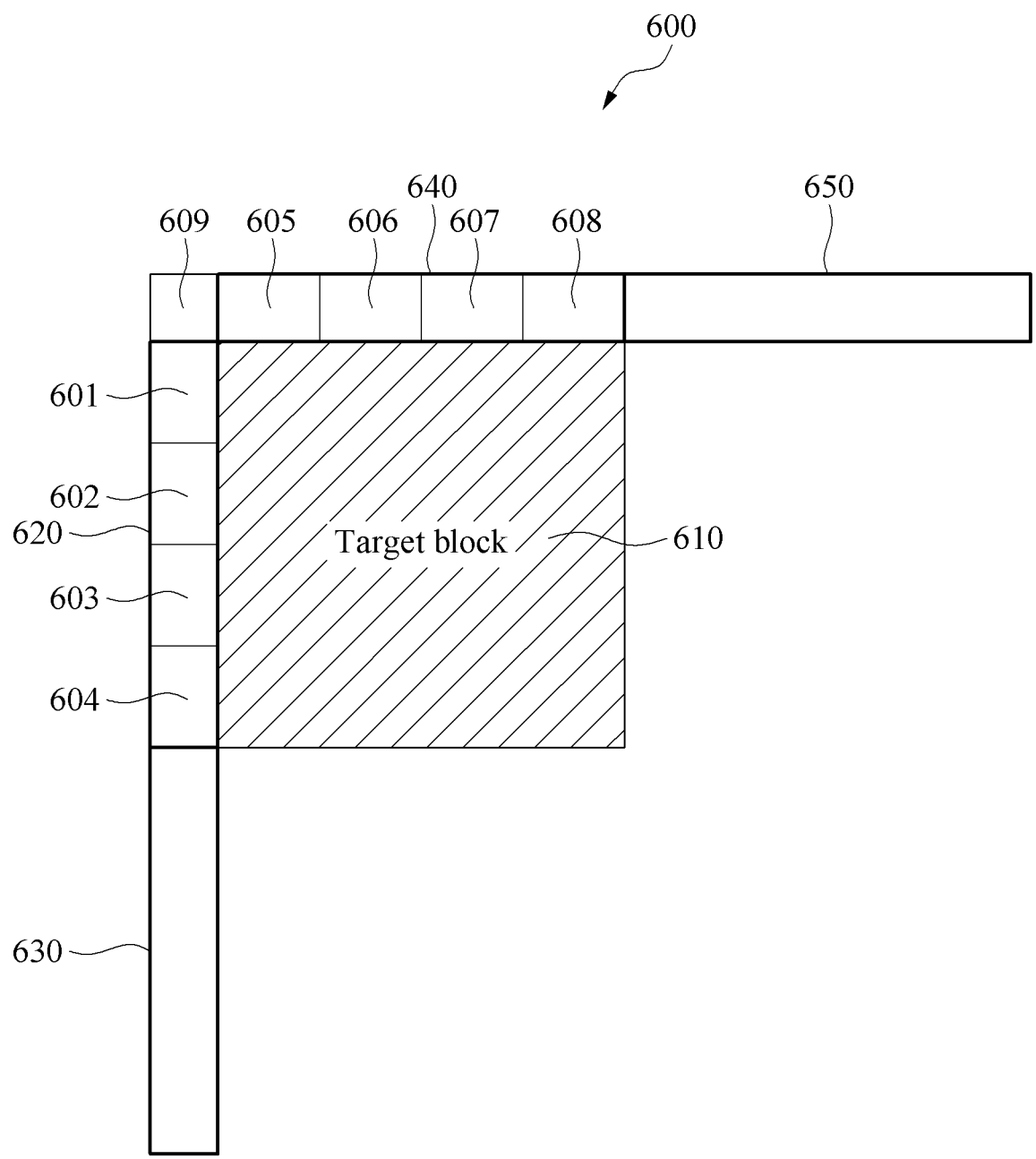
FIG. 6 illustrates an example of positions of neighbor blocks used in a first simulated predictor, according to one or more embodiments.

FIG. 6 illustrates an example of positions of neighbor blocks used in a first simulated predictor, according to one or more embodiments. Referring to FIG. 6, a target block 610 and pixels 601, 602, 603, 604, 605, 606, 607, 608, and 609 of neighbor blocks 620, 630, 640, and 650 adjacent to the target block 610 are illustrated. Hereinafter, for convenience of description, the pixel(s) of the neighbor blocks adjacent to the target block are referred to as "reference pixel(s)". The neighbor blocks 620, 630, 640, and 650 may correspond to reconstructed blocks (of the target image).

The reference pixels may include the reference pixels 601, 602, 603, and 604 of a left block 620 of the target block 610, reference pixels of a below-left block 630 of the target block 610, the reference pixels 605, 606, 607, and 608 of an above block 640 of the target block 610, reference pixels of an above-right block 650 of the target block 610, and the reference pixel 609 of an above-left corner of the target block 610.

For example, the reference pixels 601, 602, 603, and 604 of the left block 620 may be reconstructed reference pixels adjacent to and left of the target block 610. The reference pixels 605, 606, 607, and 608 of the above block 640 may be reconstructed reference pixels adjacent to and above the target block 610.

The reference pixel 609 may be a reconstructed reference pixel positioned at the above-left corner of the target block. Also, the reference pixels of the below-left block 630 may be reference pixels positioned below and left of a left pixel line among pixels positioned on the same line as a left pixel line including the reference pixels of the left block 620. The reference pixels of the above-right block 650 may be reference pixels positioned to the right of and above a pixel line among pixels positioned on the same line as an above pixel line including the reference pixels 605, 606, 607, and 608 of the above block 640.

When a size of the target block 610 is N×N (bits), the number of the reference pixels of the left block 620, the reference pixels of the below-left block 630, the reference pixels 605, 606, 607, and 608 of the above block 640 and the reference pixels of the above-right block 650 may be N, respectively.

A first block, which is a block predicted by the first simulated predictor, may be generated via intra-frame prediction of the target block 610. The first simulated predictor may generate the first block by determining pixel values of the first block. The size of the target block 610 and the first block may be the same.

Reference pixels used for intra-frame prediction of the target block 610 may vary according to an intra-frame prediction mode of the target block 610. A dependency relationship between the reference pixels and the pixels of the first block may be determined according to a prediction direction according to an intra-frame prediction mode. For example, the values of the reference pixels at a predetermined position of the target block 610 may be used as the values of one or more pixels at a predetermined position of the first block. In this example, the reference pixels at a predetermined position and the one or more pixels at a predetermined position of the first block may be a pixel or pixels at a position designated as a straight line according to the prediction direction of the intra-frame prediction mode. For example, a value of a reference pixel may be copied to a value of a pixel positioned in a backward direction to the prediction direction of the intra-frame prediction mode. Alternatively, a value of a pixel of the first block may be a value of a reference pixel positioned in the prediction direction of the intra-frame prediction mode based on the position of the corresponding pixel.

For example, when the intra-frame prediction mode of the target block 610 is a vertical mode in which a mode value is 26 as illustrated in FIG. 5, the reference pixels 605, 606, 607, and 608 of the above block 640 may be used for intra-frame prediction. When the intra-frame prediction mode is a vertical mode, the values of the pixels of the first block may be the values of the reference pixels positioned vertically above the positions of the corresponding pixels. Accordingly, the reference pixels 605, 606, 607, and 608 of the above block 640 adjacent to the above of the target block 610 may be used for intra-frame prediction. In addition, the values of the pixels in one row of the first block may be the same as the values of the reference pixels 605, 606, 607, and 608 of the above block 640.

Also, when the intra-frame prediction mode of the target block 610 has a mode value of 11 to 25 illustrated in FIG. 5, the reference pixel 609 in the above-left corner may be used for intra-frame prediction.

The number of reference pixels used to determine one pixel value of the first block may be one or two or more.

As described above, the pixel values of the pixels of the first block may be determined according to a position of the corresponding pixel and a position of the reference pixel indicated by a prediction direction of the intra-frame prediction mode.

The first block generated by the intra-frame prediction may not be identical to the original target block 610. In other words, there may be a prediction error which is a difference between the target block 610 and the first block predicted by the first simulated predictor, and errors may also exist between the pixels of the target block 610 and the pixels of the first block. The difference between an original block and a predicted block may be referred to as a "residual". The terms "difference", "residual", and "(prediction) error" may be used interchangeably.

When the intra-frame prediction mode is a directional mode, as a distance between the pixels of the first block and the reference pixels increases, a greater prediction error may occur.

FIG. 7 illustrates an example of intra-frame vectors and intra-frame matrices used in a first simulated predictor, according to one or more embodiments. Referring to FIG. 7, an example 700 configuration of an intra-frame matrix $M_n^{intra}$ 750 defined according to a vertical intra-frame prediction mode when a size of the target block 301 is 4×4, that is, when K=4 is satisfied is illustrated.

For example, when an intra-frame prediction mode is a vertical mode (one of the directional modes), the first simulated predictor may generate an intra-frame vector $v_t^{intra}$ 730 by duplicating and filling the pixel values of the above pixels 302 of the target block 301 in a vertical direction as illustrated in example 710.

In this example, the intra-frame matrix $M_n^{intra}$ 750 corresponding to modes of different angles (directions) such as a horizontal mode or a diagonal mode among the angular/directional modes may also be configured by pre-calculating a weight for a direction in which the reference pixels of neighbor blocks are duplicated.

When the intra-frame prediction mode is an angular/directional mode, the intra-frame matrices $M_n^{intra}$ corresponding to the angular mode may be expressed by, for example, Equation 2.

$$M_n^{intra}(i,j) = \begin{cases} d(i,j) & \text{if } x^{intra}(i) \text{ and } x^{intra}(j) \text{ are in the same direction} \\ 0 & \text{otherwise} \end{cases} \quad \text{Equation 2}$$

Here, $x^{intra}$ denotes an intra-frame predicted block, and $x^{intra}(i)$ denotes an i-th pixel of the intra-frame predicted block. $x^{intra}(j)$ denotes a j-th pixel of the intra-frame predicted block. i and j may be 1D representations of 2D ordering, which may be due to lexicographical ordering. Also, d(i, j) may be a value of 1, or may have a value between 0 and 1 when $x^{intra}(i)$ and $x^{intra}(j)$ are in the same direction.

In addition, when the intra-frame prediction mode is the non-directional DC mode, the intra-frame matrices $M_n^{intra}$ corresponding to the DC mode may be expressed by, for example, Equation 3.

$$M_n^{intra}(i, j) = \begin{cases} \frac{1}{K^2} & \text{if } 0 < j \le 2K \\ 0 & \text{otherwise} \end{cases} \quad \text{Equation 3}$$

Here, K denotes a size of the target block.

The first simulated predictor may generate first candidate blocks $\tilde{x}_{t,n}^{intra}$ predicted for intra all directions of the target block 301 by performing a matrix multiplication between predefined intra-frame matrices $M_n^{intra}$ 750 for the intra-frame prediction modes and the intra-frame vector $v_t^{intra}$ 730.

The first simulated predictor may begin selection of a first block by inputting the first candidate blocks and the target block to a first network. The operation of the first network is described with reference to FIG. 8.

Figure 8:
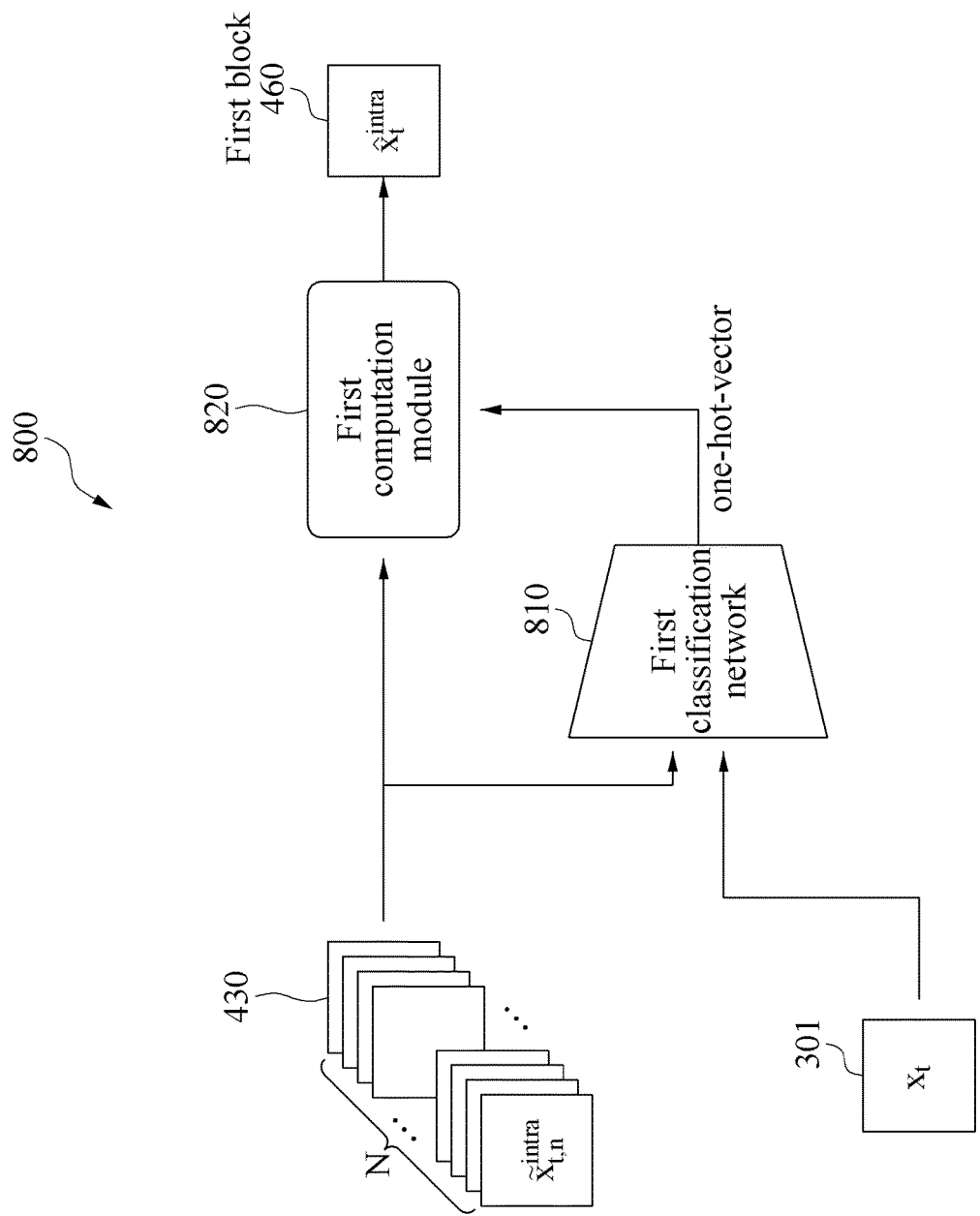
FIG. 8 illustrates an example operation of a first network, according to one or more embodiments.

FIG. 8 illustrates an example operation of a first network, according to one or more embodiments. Referring to FIG. 8, a first network 800 may include a first classification network 810 and a first computation module 820. The first network 800 may correspond to the first network 450 of FIG. 4.

As N first candidate blocks $\tilde{x}_{t,n}^{intra}$ 430 and the target block 301 are input to the first network 800, the N first candidate blocks 430 may be applied to the first classification network 810 and the first computation module 820, and the target block 301 may be applied to the first classification network 810.

The first classification network 810 may output a one-hot-vector whose elements are values predicted by the network 810 based on respective differences between the target block 301 and the N first candidate blocks 430. Specifically, the first classification network 810 may generate a probability distribution based on a distortion loss for each of the N first candidate blocks 430 as an intermediate result (e.g., a latent vector or feature map) and output an N-dimensional one-hot-vector representing only the final largest element among the intermediate result as 1 (the others are 0).

The first computation module 820 may perform a channel-wise multiplication between the one-hot-vector output from the first classification network 810 and the N first candidate blocks 430 to select the first block $\hat{x}_t^{intra}$ 460. Here, the first block 460 may be selected based on a distortion loss between the N first candidate blocks 430 and the target block 301.

Figure 9:
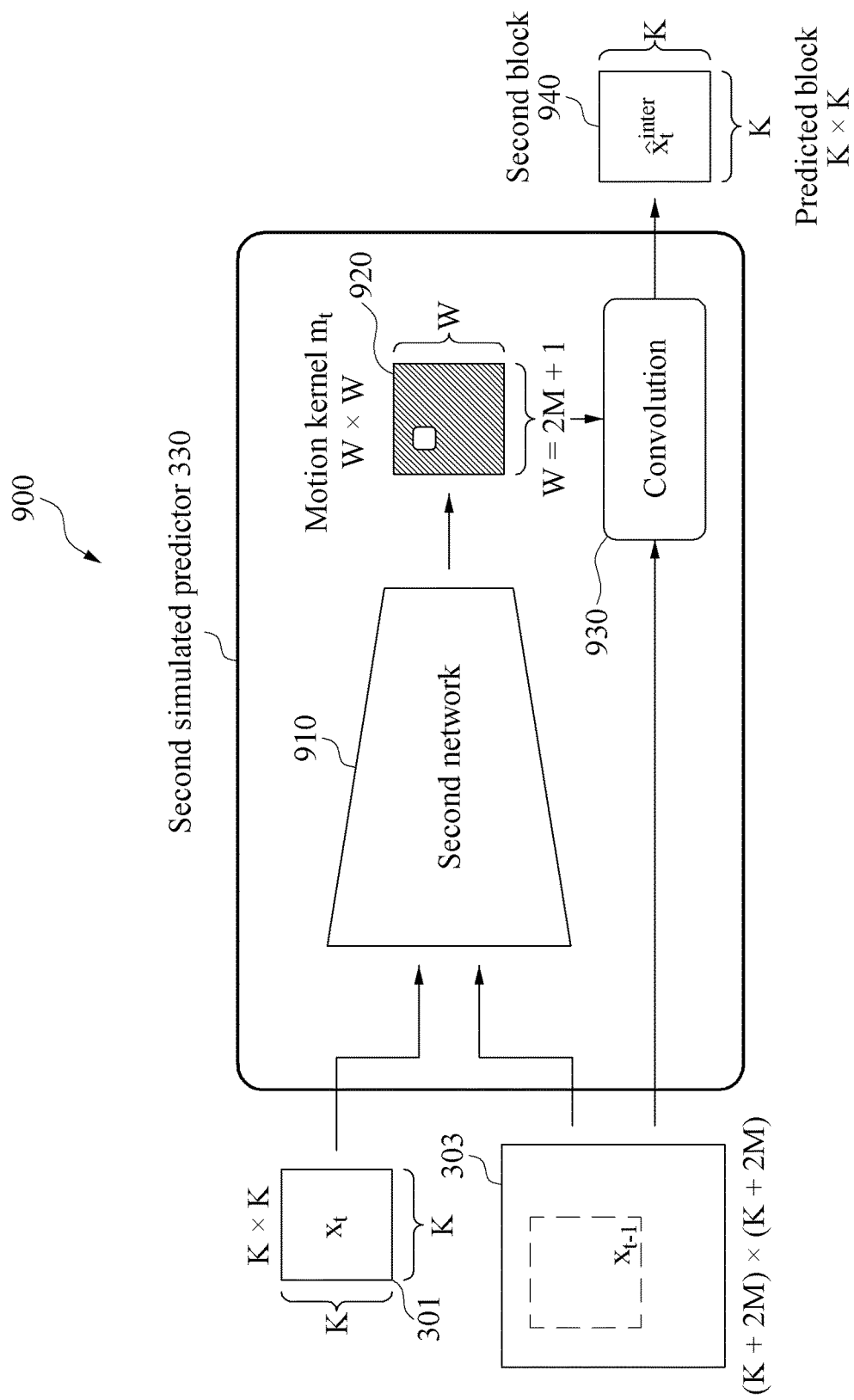
FIG. 9 illustrates an example operation of a second simulated predictor, according to one or more embodiments.

FIG. 9 illustrates an example operation of a second simulated predictor, according to one or more embodiments. Referring to FIG. 9, an example 900 of an operation by which the second simulated predictor 330 predicts a second block $\hat{x}_t^{inter}$ 940 corresponding to the target block 301, in accordance with the target block $x_t$ 301 and the reference block 303 being applied, is illustrated.

The target block $x_t$ 301 may have, for example, a size of K×K, which is K pixels horizontally and K pixels vertically. The reference block 303 may have a size greater than the size of the target block $x_t$ 301 by a size of a search range (e.g., ±M). The reference block 303 may include a reference block of one frame or may include reference blocks of a plurality of frames.

As described above, the target block 301 and the reference block 303 having different sizes may be applied as inputs to the second simulated predictor 330.

The second simulated predictor 330 may include the second network 910 and a convolution operation module 930.

Based on a comparison result between the reference block 303 and the target block 301, the second network 910 may generate a motion kernel $m_t$ 920 according to a prediction mode. The second network 910 may generate the motion kernel 920 using the reference block 303 (which is of a frame determined based on the prediction mode) based on the comparison result between the reference block 303 and the target block 301. The motion kernel 920 may be a 2D vector used in inter-frame prediction. The motion kernel 920 may be an offset corresponding to a movement distance between the target block 301 and the reference block 303.

The second simulated predictor 330 may generate the motion vector 920 according to a size (e.g., ±M) of the search range that is input. For example, when the size of the search range is M pixels, the reference block 303 has a size greater than the size K of the target block 301 by the size M of the search range, so the reference block 303 may have a size of (K+2M)×(K+2M).

The second network 910 may generate a latent vector based on the target block 301 and the reference block 303. The latent vector may correspond to, for example, an intermediate result obtained by passing features extracted from each of the target block 301 and the reference block 303 through a convolution network. The latent vector may have the form of a feature map. The latent vector may include, for example, a difference and/or cross correlation between candidate areas of the reference block 303 and the target block 301 through unfolding of the candidate areas, but is not limited thereto. The second network 910 may generate the motion kernel 920 according to the size of the search range using the latent vector.

The second network 910 may search the reference block 303 for an area that best matches the target block 301, that is, an area with the highest similarity (among areas in the reference block 303), and generate the motion kernel 920 based on a difference between the features of the target block 301 and the features of the searched and selected area (the best matching area).

The second network 910 may generate a probability distribution (that is based on a distortion loss) as an intermediate result (e.g., a latent vector or feature map) and generate the motion kernel 920 according to a prediction mode using the intermediate result. The prediction mode may be predetermined in a profile of an image including a current frame.

For example, when the prediction mode is a P-frame prediction mode, the second network 910 may generate the motion kernel 920 in a one-hot-vector form from one reference block 303 of a previous frame. Alternatively, when the prediction mode is a B-Frame prediction mode, the second network 910 may generate the motion kernel 920 having one or more non-zero values based on the probability distribution of the reference blocks 303 based on the distortion loss.

The second network 910 may also be referred to as a "motion estimation network" in that it predicts a block changed according to motion.

In standard codecs, an inter-frame prediction process for minimizing distortion loss through full-search and 3-step-search methods is non-differentiable, but in an example, by simulating the corresponding process in a differentiable form, the second simulated predictor (e.g., second simulated predictor 330) may become trainable.

The convolution operation module 930 may output the second block 940 predicted according to the prediction mode by performing a convolution operation between the motion kernel 920 generated through the above-described process and the reference block 303.

Among candidate areas of the reference block 303, the convolution operation module 930 may output the candidate area having the highest similarity with the target block 301 as the second block 940, which may be output/generated via the convolution operation between the motion kernel 920 and the reference block 303.

The convolution operation module 930 may compare the target block 301 with candidate areas obtained by shifting (stepping) the target block $x_t$ 301 over the reference block 303 by ±M pixels in the horizontal and vertical directions, and predict the candidate area having the highest similarity with the target block 301 to be the second block 940.

For example, when a size of the motion kernel 920 is W×W and W=2M+1, the convolution operation module 930 may perform a convolution operation between the motion kernel 920 and the reference block 303 to acquire the second block 940 having the same size (e.g., K×K) as the target block 301.

When the motion kernel 920 has a value of 1 at a position separated by $(m_t(x), m_t(y))$ from a central point, and has a value of 0 at other positions, the second simulated predictor 330 may output a K×K size block as the second block 940 in an area separated by $(m_t(x), m_t(y))$ from the center of the reference block 303. The horizontal and vertical dimensions of the motion kernel 920 may always be odd numbers according to the equation (W=2M+1). For example, assuming that a size of the motion kernel 920 is 3×3, the center point may correspond to a position (2,2) from the left-above of the motion kernel 920. In this example, $m_t(x)$, may correspond to horizontal coordinates, and $m_t(y)$ may correspond to vertical coordinates.

Alternatively, when the motion kernel 920 has a value of 0.5 at positions separated by $(m_{t,1}(x), m_{t,1}(y))$ and $(m_{t,2}(x), m_{t,2}(y))$, respectively, from the central point, and has a value of 0 at other positions, the second simulated predictor 330 may output a block having an average value of K × K size blocks as the second block 940 in an area corresponding to a position separated by $(m_{t,1}(x), m_{t,1}(y))$ and $(m_{t,2}(x), m_{t,2}(y))$, respectively, from the center of the reference block 303.

Figure 10:
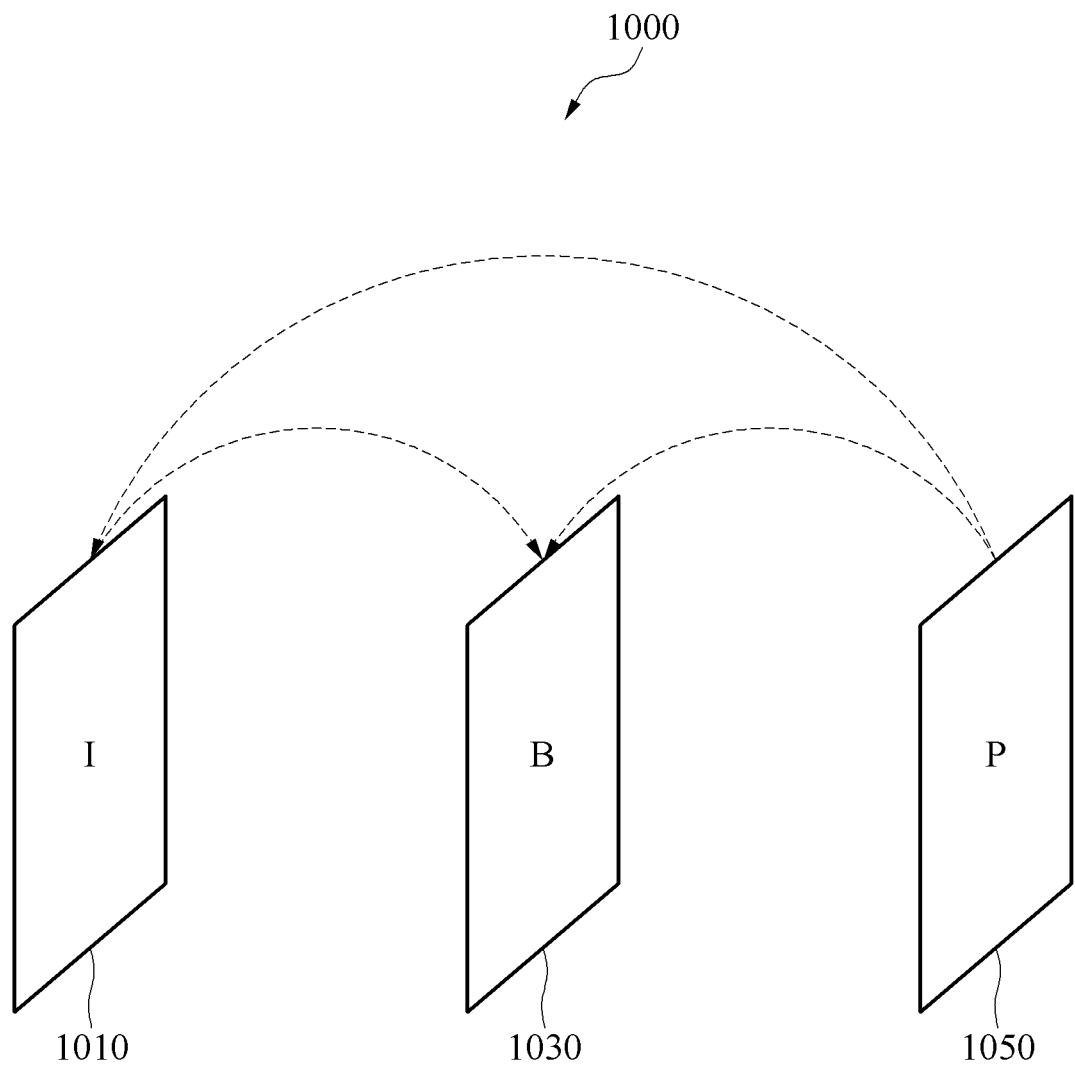
FIG. 10 illustrates an example prediction process of a second block, according to one or more embodiments.

FIG. 10 illustrates an example prediction process of a second block, according to one or more embodiments. Referring to FIG. 10, an example 1000 of image frames 1010, 1030, and 1050 used according to a prediction mode in an inter-frame prediction process of a second block is illustrated.

An image may include a series of still images. Still images may be divided into the unit of a group of pictures (GOP). Each of the still images may be referred to as a "picture", "frame", or "image frame".

Inter-frame prediction may be based on the fact that there is a high correlation between adjacent pixels in an image, and similarly, each image frame of an image has a high temporal correlation with each other. Accordingly, a prediction value for a target block in a current frame may be generated from an image frame reconstructed at a previous time. A technique of generating a predicted block from an image frame reconstructed at a previous time may be referred to as "inter-frame prediction".

For example, with respect to an image made up of 30 image frames in 1 second, the difference between one image frame and an adjacent reference frame is small, so it may be difficult for the human eye to distinguish the difference. Therefore, when an image is output as 30 image frames for 1 second, a person may perceive each image frame as being continuous. In inter-frame prediction, when images of the previous frame and the current frame are similar, an unknown pixel value of the current frame may be predicted from a known pixel value of the previous frame. Inter-frame prediction may be performed based on motion prediction. Motion prediction may be performed by referring to a previous frame based on a time axis or by referring to both previous and subsequent frames. An image frame referred to for encoding or decoding a current frame may be referred to as a "reference frame".

The rectangles illustrated in FIG. 10 represent the image frames 1010, 1030, and 1050. In addition, the arrows illustrated in FIG. 10 indicate a prediction direction such as forward and backward.

The image frames 1010, 1030, and 1050 may be encoded and/or decoded according to a prediction direction. A prediction direction may be determined by a prediction mode. The prediction mode may correspond to a parameter indicating which scheme among an I-frame prediction, P-frame prediction, and/or B-frame prediction is to be performed when predicting a predicted block.

The image frames 1010, 1030, and 1050 may be classified as an intra-frame (I-frame) 1010, a bi-directional frame (B-frame) 1030, and a predicted frame (P-frame) 1050 according to an encoding type. Each of the image frames 1010, 1030, and 1050 may be encoded and/or decoded according to an encoding type corresponding to the corresponding image frame.

When a target image to be encoded is the I-frame 1010, the target image may be independently encoded using data within the image itself without performing inter-frame prediction which uses another reference frame. The I-frame 1010 may be encoded by intra-frame prediction.

When the target image is the B-frame 1030, the second simulated predictor may perform motion estimation and motion compensation for encoding the B-frame 1030 via inter-frame prediction using reference frames existing in both temporal directions. In this example, "reference frames existing in both directions" may correspond to the I-frame 1010 positioned immediately before the B-frame 1030 in a backward direction and the P-frame 1050 positioned immediately following the B-frame 1030 in a forward direction. By referring to both the I-frame 1010 and the P-frame 1050, the B-frame 1030 may store data predicting a motion between the two frames.

When the target image is the P-frame 1050, the second simulated predictor may perform motion prediction and motion compensation for encoding the P-frame 1050 via inter-frame prediction using a reference frame (e.g., the I-frame 1010) existing in one direction. In this example, the one direction may be a forward direction or a backward direction.

As such, in inter-frame prediction, a motion may be predicted and compensated for by using one reference frame as well as a plurality of reference frames.

The second simulated predictor may perform inter-frame prediction on a target block using reference block(s) of a reference frame temporally adjacent to the current frame in either temporal direction.

The second simulated predictor may specify candidate areas within the reference frame using an indicator indicating the reference frame and a motion kernel. The indicator indicating the reference frame may be determined according to a prediction mode. The candidate areas within the reference frame may correspond, positionally, to partial areas of the reference block.

The second simulated predictor may select the reference frame according to a prediction mode and select the reference block corresponding to a target block in the reference frame. The second simulated predictor may generate a predicted block ("second block") for the target block by using a candidate area ("reference block") selected from among the candidate areas in the reference frame.

The inter-frame prediction process may correspond to a process of finding a reference block most similar to a target block among candidate areas ("reference blocks") in the reference frame(s) through motion estimation and generating a predicted block ("second block") through motion compensation. The second simulated predictor may include a neural network trained to minimize a difference between the predicted block ("second block") and the target block.

Figure 11:
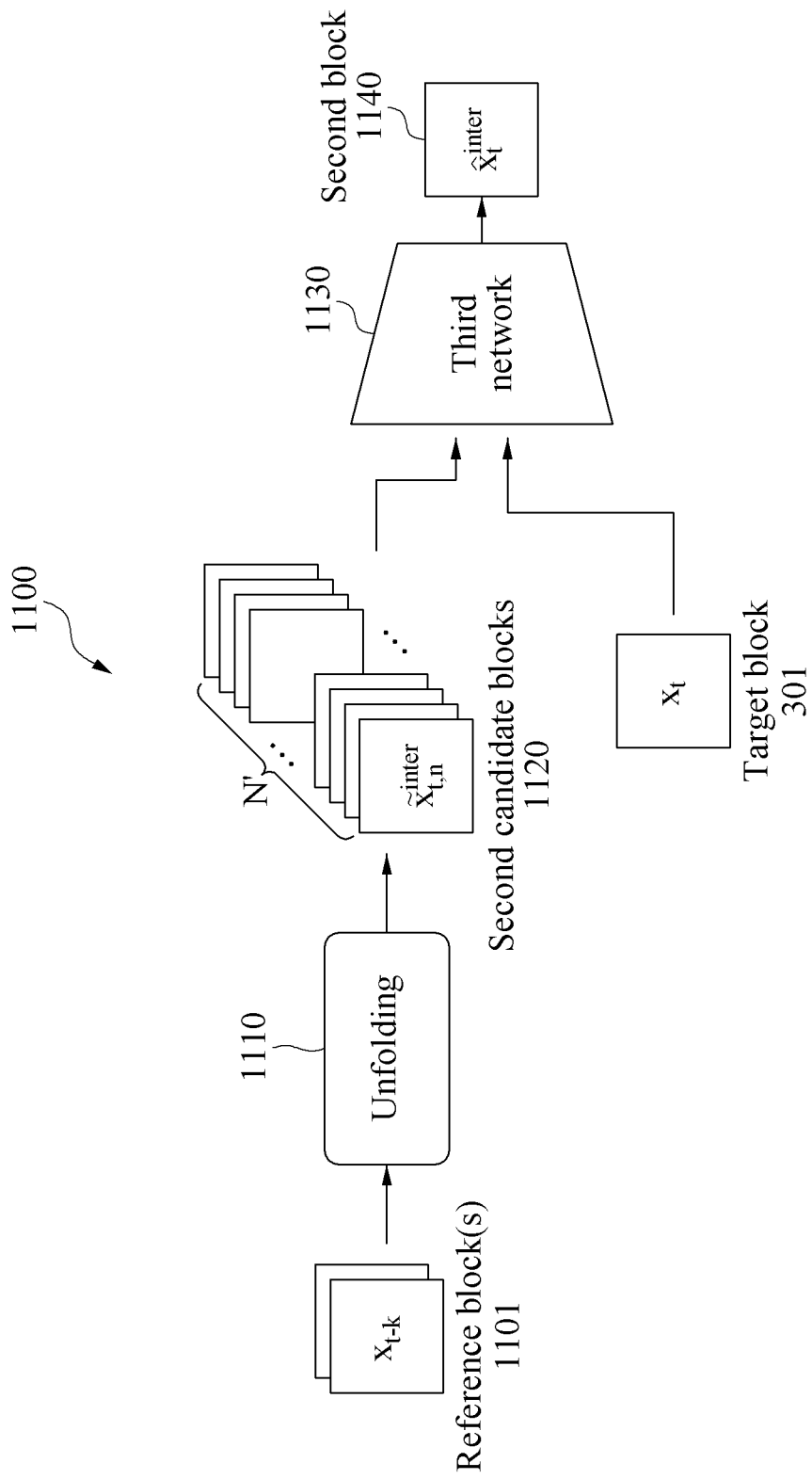
FIG. 11 illustrates an example operation of a second simulated predictor, according to one or more embodiments.

FIG. 11 illustrates an example operation of a second simulated predictor, according to one or more embodiments. Referring to FIG. 11, a second simulated predictor 1100 may predict a second block 1140 corresponding to a target block using a third network 1130 as a plurality of reference block(s) 1101 and the target block 301 are input to the third network 1130.

The second simulated predictor 1100 may generate second candidate blocks 1120 having the same size as the target block by unfolding 1110 the plurality of reference blocks 1101. The number of second candidate blocks 1120 may be, for example, N' (N'>0).

The second simulated predictor 1100 may arrange the second candidate blocks 1120 in a channel direction and apply the second candidate blocks 1120 that are arranged as an input to the third network 1130 to predict the second block 1140 corresponding to the target block.

The third network 1130, as a neural network having a differentiable structure (a structure configured/trained for differentiation), may be included in the second simulated predictor 1100.

The third network 1130 may select one of the second candidate blocks 1120 as the second block 1140 based on a difference between the second candidate blocks 1120 and the target block 301. The third network 1130 may select the second candidate block having the smallest difference from the target block 301. That is, a second candidate block that is the most similar to the target block 301 is selected as the second block 1140. The structure and learning of the third network 1130 may be similar to that of the second network 910 described with reference to FIG. 9.

Figure 12:
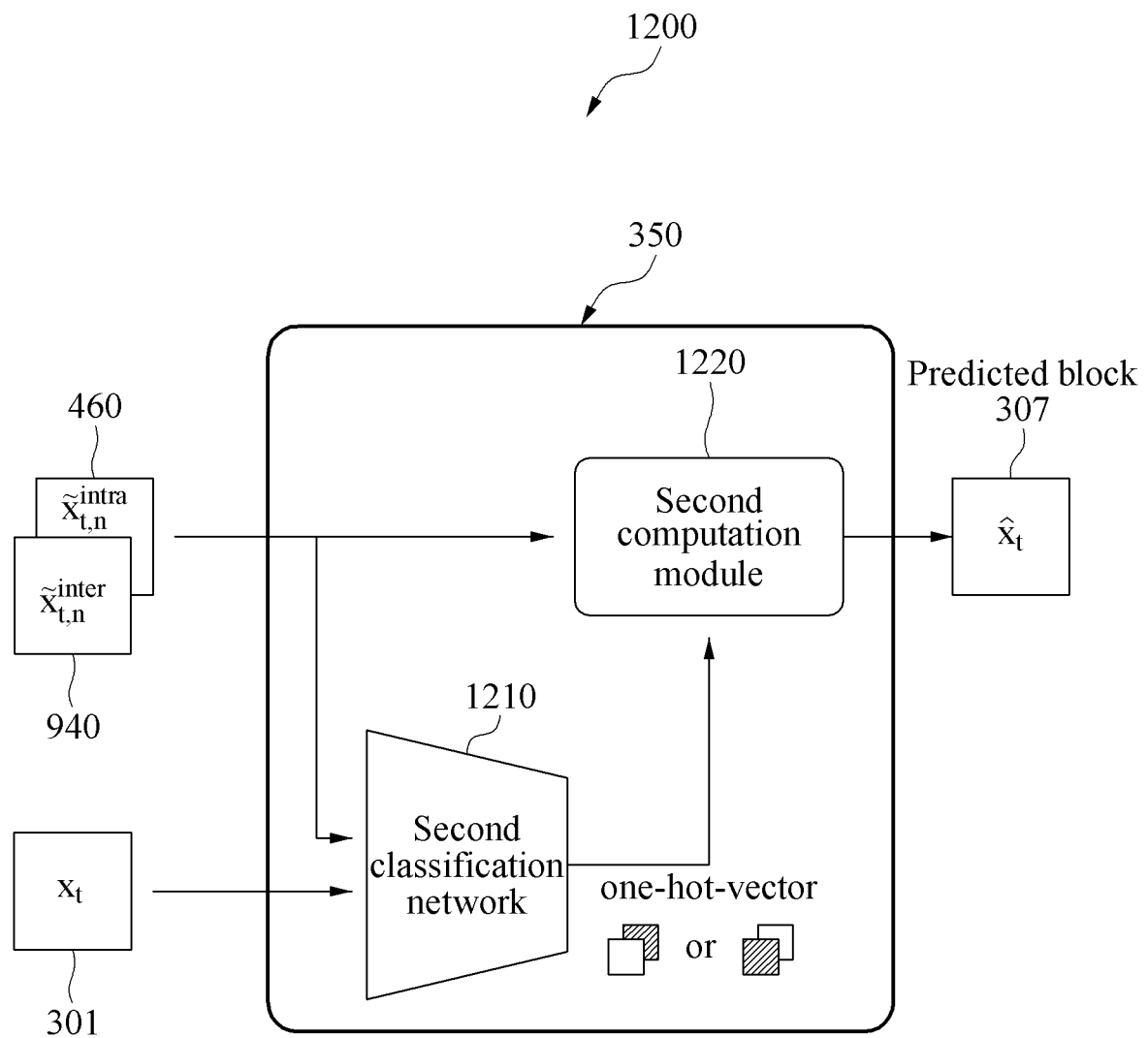
FIG. 12 illustrates an example operation of a selection network, according to one or more embodiments.

FIG. 12 illustrates an example operation of a selection network, according to one or more embodiments. Referring to FIG. 12, an example 1200 of a structure and operation of the selection network 350 is illustrated.

When the selection network 350 receives the first block 460 predicted by the first simulated predictor, the second block 940 predicted by the second simulated predictor, and the target block 301 as inputs, the selection network 350 may select, as the predicted block 307, from among the first block 460 and the second block 940, the block having a smaller distortion loss.

The selection network 350 may include a second classification network 1210 and a second computation module 1220.

The second classification network 1210 may output one-hot-vectors corresponding to probability distributions based on differences between each of the first block 460 and the second block 940, and the target block 301. The one-hot-vectors may be 2D one-hot-vectors in which an element corresponding to the first block 460 or an element corresponding to the second block 940 is set to 1.

The second classification network 1210 may output one-hot-vectors corresponding to probability distributions based on a first distortion loss between the first block 460 and the target block 301 and a second distortion loss between the second block 940 and the target block 301, respectively.

The second computation module 1220 may whichever of the first block 460 and the second block 940 has a smaller distortion loss as the predicted block 307, and may do so by performing channel-wise multiplication between each of the first block 460 and the second block 940, and the one-hot-vectors.

In addition, the selection, by the network 350, between the first block 460 and the second block 940 as the predicted block 307 may also be based on a prediction mode inputted to the network 350.

For example, when the prediction mode is a P-frame prediction mode or a B-Frame prediction mode, the selection network 350 may output any one block selected from the first block 460 and the second block 940 in the second computation module 1220 as the predicted block 307. Alternatively, when the prediction mode is an I-frame prediction mode, the selection network 350 may output the first block 460 corresponding to an intra prediction result as the predicted block 307 without performing channel-wise multiplication in the second computation module 1220.

Figure 13:
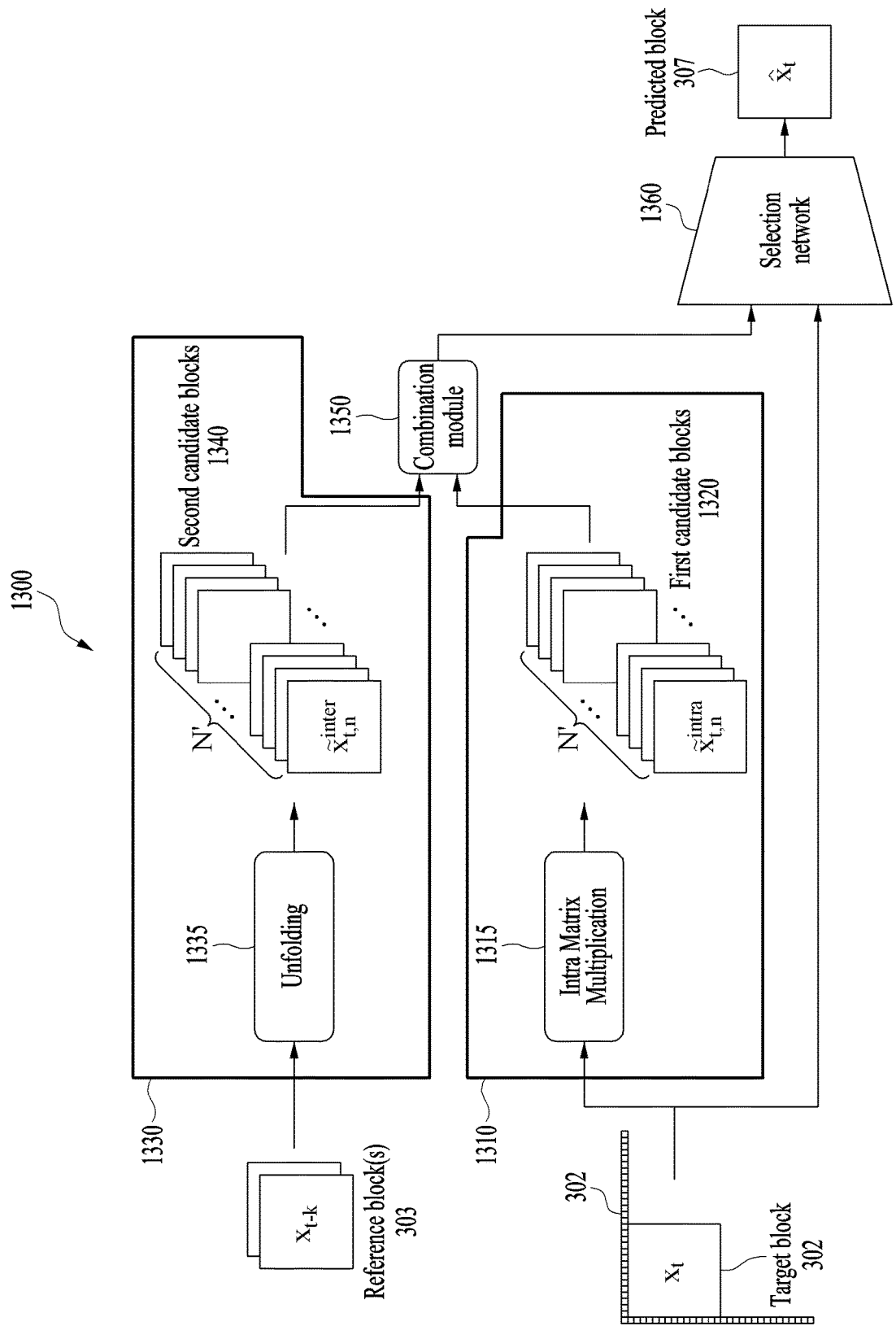
FIG. 13 illustrates an example neural codec, according to one or more embodiments.

FIG. 13 illustrates an example neural codec, according to one or more embodiments. Referring to FIG. 13, a neural codec 1300 may include a first simulated predictor 1310, a second simulated predictor 1330, a combination module 1350, and a selection network 1360.

The first simulated predictor 1310 may generate first candidate blocks 1320 by referring to the pixels 302 of the neighbor blocks adjacent to the target block 301 of a current to-be-predicted frame. The first simulated predictor 1310 may generate an intra vector by replicating the pixels 302 of the neighbor blocks in a vertical direction, and generate the first candidate blocks 1320 by an intra matrix multiplication 1315 between the intra vector and predefined intra matrices.

The second simulated predictor 1330 may generate second candidate blocks 1340 having the same size as the target block 301 by unfolding 1335 the reference blocks 303 of a reference frame adjacent to the current frame.

The combination module 1350 may generate combined blocks obtained by concatenating the first candidate blocks 1320 generated by the first simulated predictor 1310 and the second candidate blocks 1340 generated by the second simulated predictor 1330.

The selection network 1360 may select one of the combined blocks as the predicted block 307 based on a difference between the combined blocks generated by the combination module 1350 and the target block 301.

Figure 14:
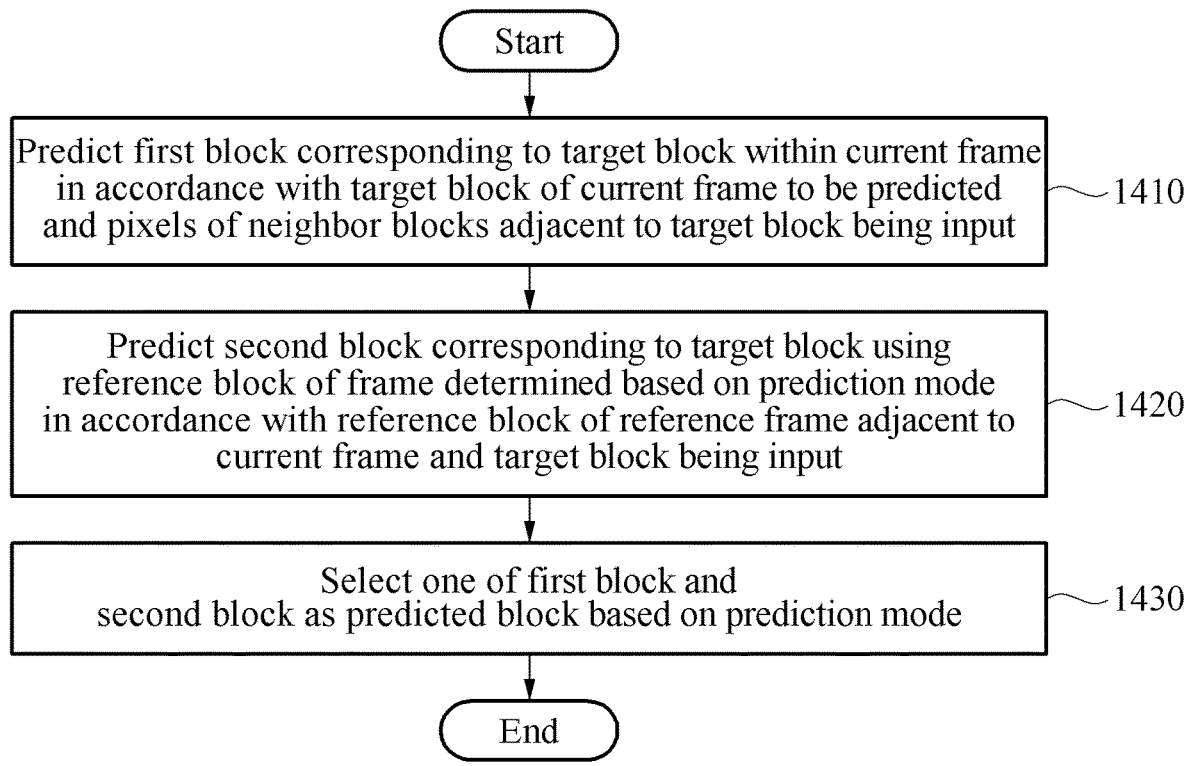
FIG. 14 illustrates an example operating method of a neural codec, according to one or more embodiments.

FIG. 14 illustrates an example operating method of a neural codec, according to one or more embodiments.

Referring to FIG. 14, a neural codec may determine a predicted block through operations 1410 to 1430.

In operation 1410, the neural codec may predict a first block corresponding to a target block within a current frame in accordance with the target block of the current to-be-predicted frame and the pixels of the neighbor blocks adjacent to the target block being input. A method of predicting the first block by the neural codec is described with reference to FIG. 15.

In operation 1420, the neural codec may predict a second block corresponding to a target block using a reference block of a frame determined based on a prediction mode, in accordance with the reference block based on a reference frame adjacent to the current frame and the target block being input. A method of predicting the second block by the neural codec is described with reference to FIG. 16.

In operation 1430, the neural codec may select between the first block predicted in operation 1410 and the second block predicted in operation 1420 as a predicted block based on the prediction mode.

Figure 15:
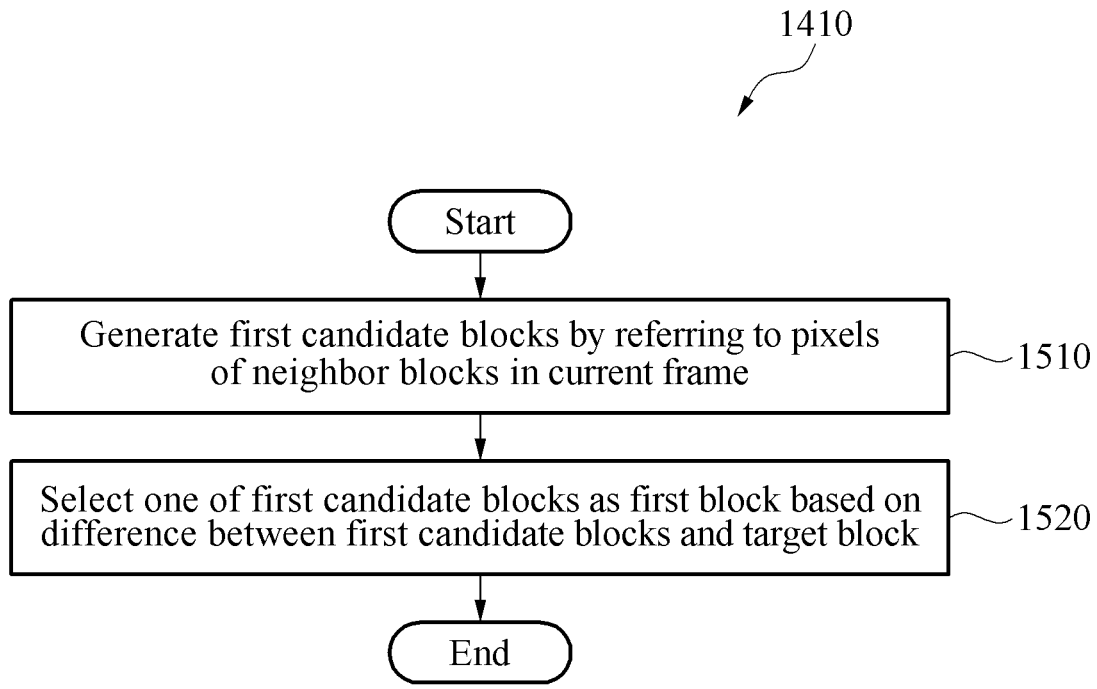
FIG. 15 illustrates an example of predicting a first block, according to one or more embodiments.

FIG. 15 illustrates an example of predicting a first block, according to one or more embodiments.

Referring to FIG. 15, the neural codec may predict the first block through operations 1510 and 1520.

In operation 1510, the neural codec may generate first candidate blocks by referring to the pixels of the neighbor blocks adjacent to the target block in the current frame. The neural codec may generate an intra-frame vector by replicating the pixels of the neighbor blocks in a vertical direction, and generate the first candidate blocks by an intra-frame matrix multiplication between the intra-frame vector and predefined intra-frame matrices.

In operation 1520, the neural codec may select one of the first candidate blocks as the first block based on a differences between target block and the first candidate blocks generated in operation 1510. The neural codec may output a one-hot-vector indicating any one of the first candidate blocks based on the differences between the target block and the first candidate blocks. The neural codec may select the first block by performing channel-wise multiplication between the one-hot-vector and the first candidate blocks.

Figure 16:
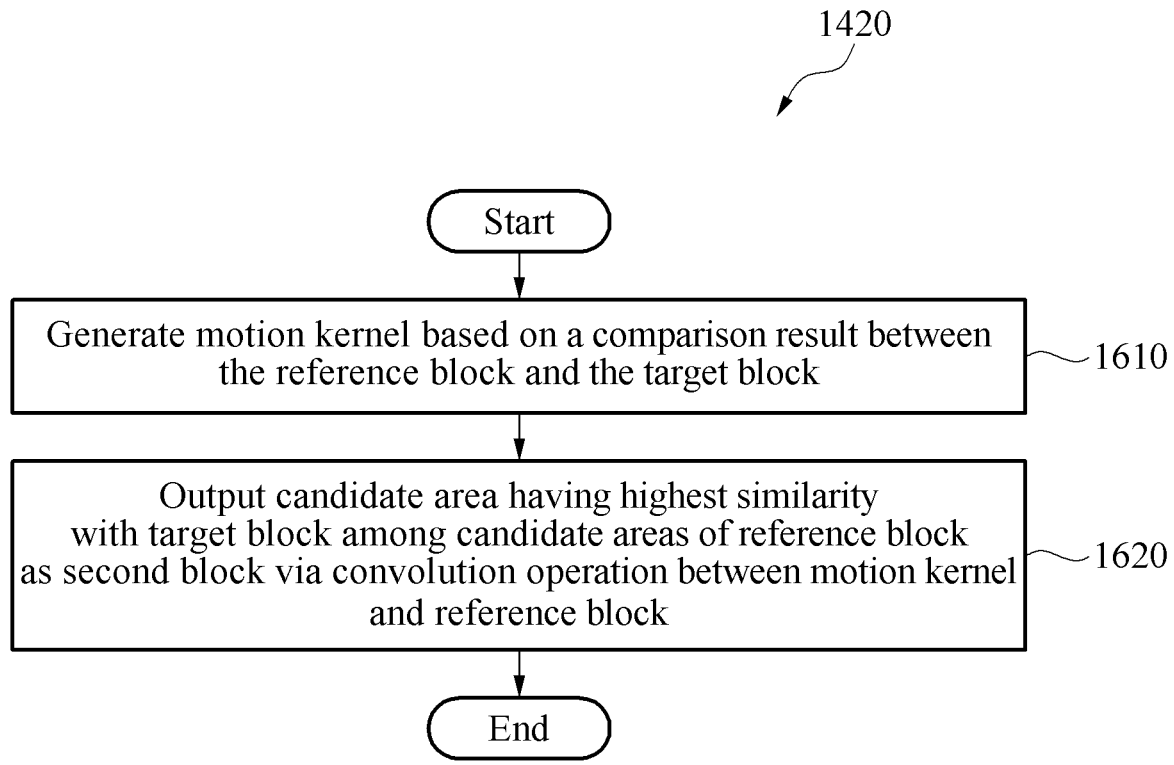
FIG. 16 illustrates an example of predicting a second block, according to one or more embodiments.

FIG. 16 illustrates an example of predicting a second block, according to one or more embodiments.

Referring to FIG. 16, the neural codec may predict the second block through operations 1610 and 1620.

In operation 1610, the neural codec may generate a motion kernel based on a comparison result between the reference block and the target block. The neural codec may generate a latent vector based on the target block and the reference block, and generate a motion kernel having a size based on the size of a search range using the latent vector. Alternatively, the neural codec may generate a feature map by extracting features of the target block and features of the reference block, and generate a motion kernel according to the size of a search range based on the feature map.

In operation 1620, the neural codec may output a candidate area having the highest similarity with the target block (among the candidate areas of the reference block) as the second block via a convolution operation between the motion kernel generated in operation 1610 and the reference block 303.

Figure 17:
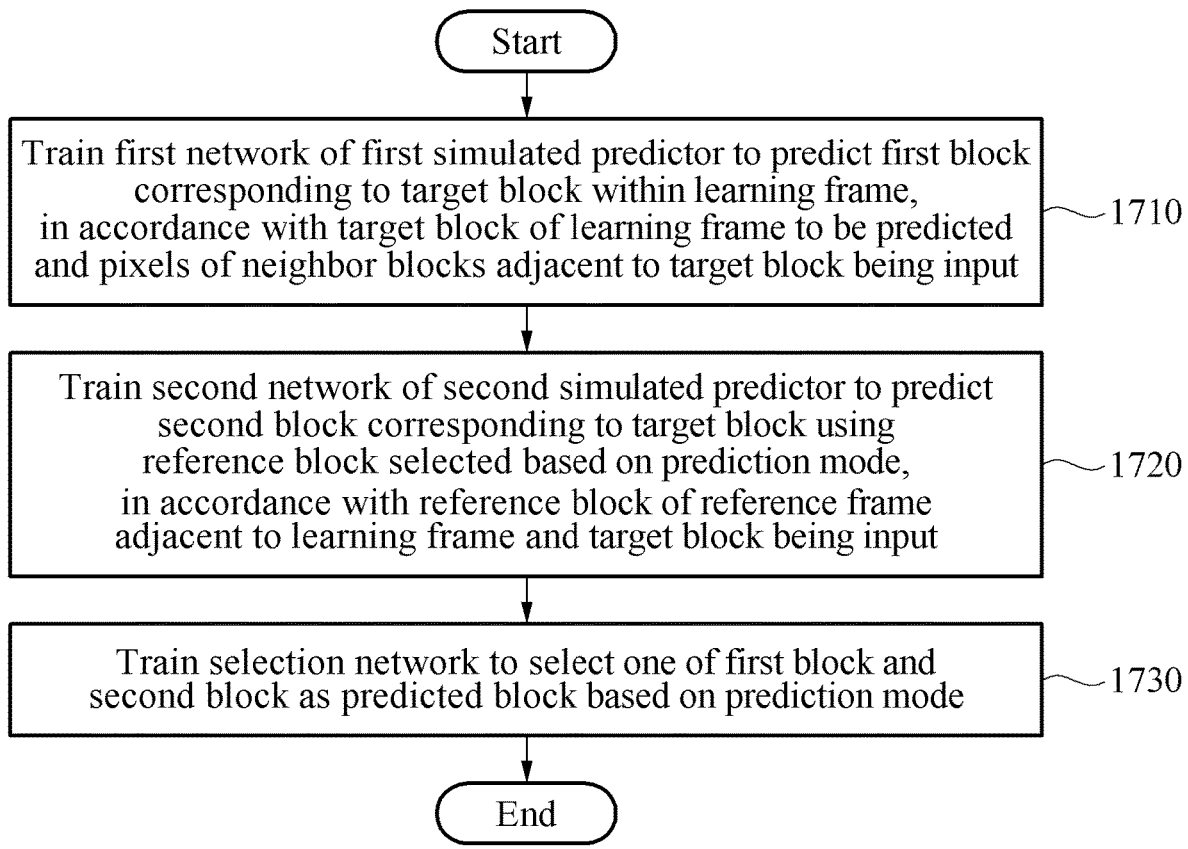
FIG. 17 illustrates an example learning method of a neural codec, according to one or more embodiments.

FIG. 17 illustrates an example learning method of a neural codec, according to one or more embodiments.

Referring to FIG. 17, a training device of a neural codec may include a first simulated predictor, a second simulated predictor, and a selection network, and may be trained through operations 1710 to 1730.

In operation 1710, the training device may train a first network of the first simulated predictor to predict a first block corresponding to a target block within a learning frame, in accordance with the target block of the to-be-predicted learning frame and the pixels of the neighbor blocks adjacent to the target block being input. A method of training the first network by the training device is described with reference to FIG. 18.

In operation 1720, the training device may train a second network of the second simulated predictor to predict a second block corresponding to a target block using a reference block selected based on a prediction mode, in accordance with the reference block based on a reference frame adjacent to the learning frame and the target block being input. A method of training the second network by the training device is described with reference to FIG. 19.

In operation 1730, the training device may train the selection network to select one of the first block and the second block as a predicted block based on the prediction mode.

Figure 18:
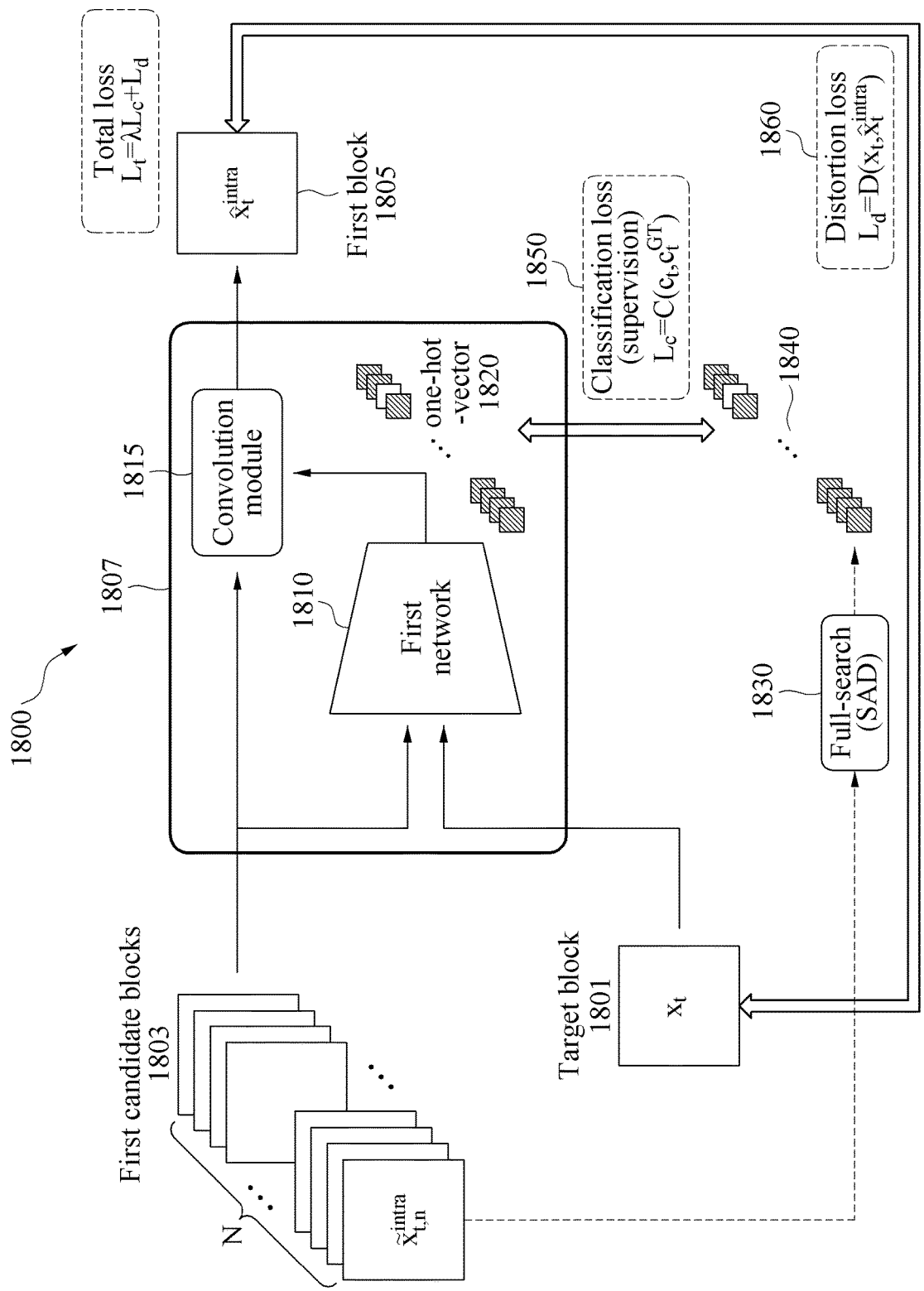
FIG. 18 illustrates an example method in which a first simulated predictor trains a first network, according to one or more embodiments.

FIG. 18 illustrates an example method in which a first simulated predictor trains a first network, according to one or more embodiments. Specifically, FIG. 18 illustrates an example 1800 of a process in which a training device of a neural codec trains a first network 1810 so that a first simulated predictor 1807 including a first network 1810 and a convolution module 1815 may predict a first block 1805.

The training device may train the first network 1810 based on a first loss 1860 between the first block 1805 selected from among first candidate blocks 1803 by a difference between the first candidate blocks 1803 and a target block 1801, and the target block 1801. The first candidate blocks 1803 may be generated by referring to the pixels of the neighbor blocks adjacent to the target block 1801. The first loss $L_d$ 1860 may be a distortion loss corresponding to a difference between the first block $\hat{x}_t^{intra}$ 1805 and the target block $x_t$ 1801, and may be expressed by, for example, $L_d = D(x_t, \hat{x}_t^{intra})$.

The training device may train the first network 1810 to minimize the first loss $L_d$ 1860.

In addition, the first network 1810 may output a first one-hot-vector 1820 corresponding to any one first candidate block among N first candidate blocks 1803 based on a difference between the N first candidate blocks 1803 and the target block 1801. The first one-hot-vector 1820 represent a label or class $c_t$ corresponding to the target block 1801.

The training device may search all available blocks within a motion range, that is, horizontally and vertically −M to M, respectively, by a full search, and output a second one-hot-vector 1840 that minimizes a sum of absolute differences (SAD) between all available blocks and the target block 1801. The second one-hot-vector 1840 represent a ground truth label or a ground truth class $c_t^{GT}$ of the learning frame.

The training device may train the first network 1810 to predict the first block 1805 by further considering a second loss 1850 between the first one-hot-vector 1820 and the second one-hot-vector 1840 in addition to the above-described first loss 1860. The second loss $L_c$ 1850 may be a classification loss corresponding to a difference between a class $c_t$ represented by the first one-hot-vector 1820 and a ground truth class $c_t^{GT}$ represented by the second one-hot-vector 1840. The second loss $L_c$ 1850, for example, may be expressed by $$L_c = C(c_t, c_t^{GT}).$$

The training device may train the first network 1810 to minimize the second loss $L_c$ 1850.

In addition, the training device may train the first network 1810 by considering the first loss $L_d$ 1860 and the second loss $L_c$ 1850 together. The training device may train the first network 1810 so that a loss $L_t$, which is obtained by a weighted sum such as, for example, $L_t = \lambda L_c + L_d$, of the first loss $L_d$ 1860 and the second loss $L_c$ 1850, is minimized. Here, λ may correspond to a weight.

Figure 19:
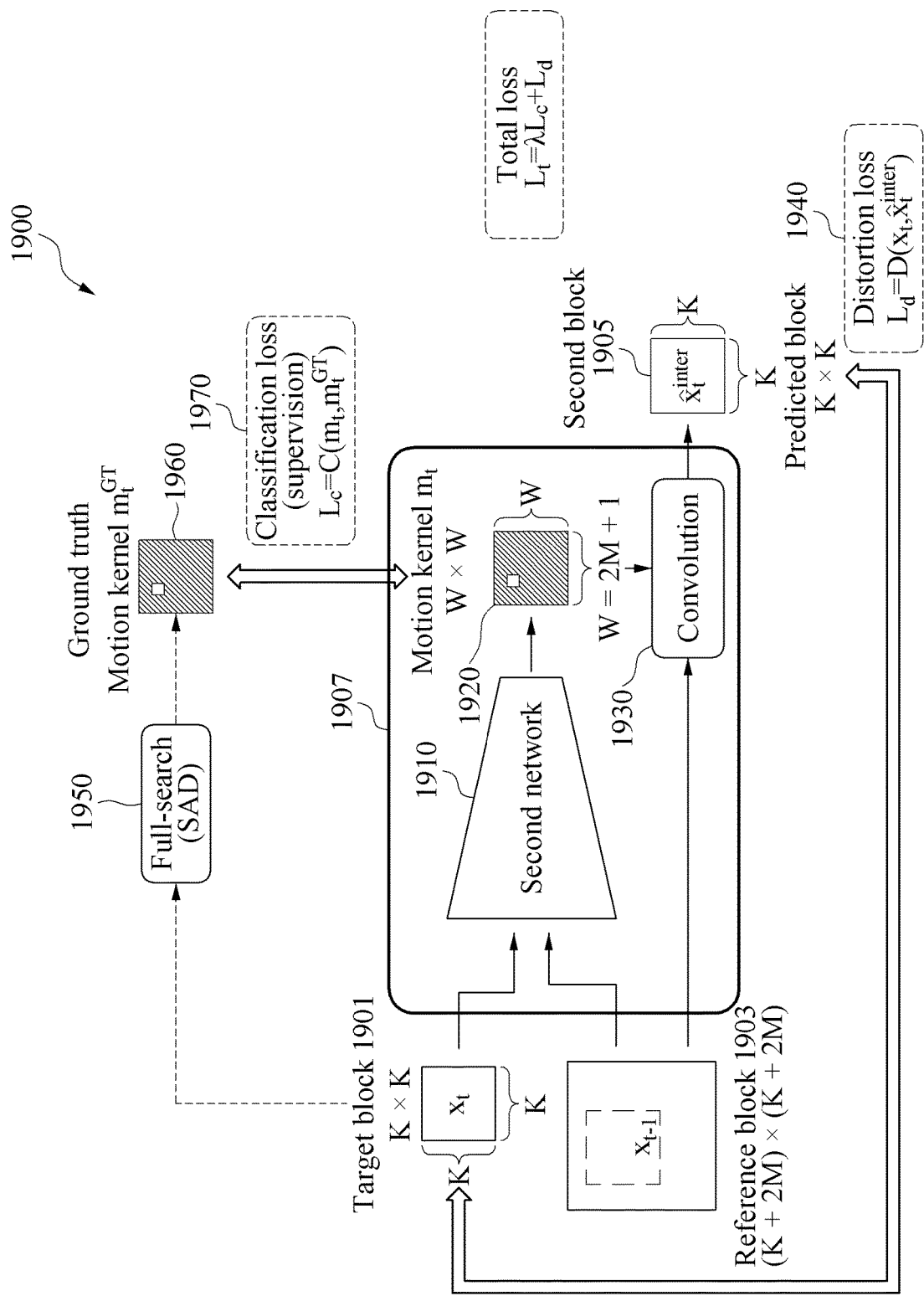
FIG. 19 illustrates an example of a method in which a second simulated predictor trains a second network, according to one or more embodiments.

FIG. 19 illustrates an example method in which a second simulated predictor trains a second network, according to one or more embodiments. Specifically, FIG. 19 illustrates an example 1900 of a process in which a training device of a neural codec trains a second network 1910 so that a second simulated predictor 1907 including a second network 1910 and a convolution operation module 1930 may predict a second block 1905.

The training device may train the second network 1910 to generate a motion kernel $m_t$ 1920 according to a prediction mode based on a comparison result between a reference block 1903 and a target block $x_t$ 1901.

The training device may train the second network 1910 to predict the second block 1905 based on a first loss 1940 between the second block $\hat{x}_t^{inter}$ 1905, which is generated via a convolution operation between the motion kernel $m_t$ 1920 and the reference block 1903 by the convolution operation module 1930, and the target block $x_t$ 1901.

The first loss 1940 may be a distortion loss La corresponding to a difference between the second block $\hat{x}_t^{inter}$ 1905 and the target block $x_t$ 1901, and may be expressed by, for example, $L_d = D(x_t, \hat{x}_t^{inter})$.

The training device may train the second network 1910 to minimize the first loss $L_d$ 1940.

In addition, the training device may train the second network 1910 to predict the second block $\hat{x}_t^{inter}$ 1905 by further considering a second loss 1970 between the motion kernel $m_t$ 1920 generated according to the prediction mode and a ground truth motion kernel $m_t^{GT}$ 1960 corresponding to the target block x, 1901, based on the comparison result between the target block $x_t$ 1901 and the reference block 1903, in addition to the first loss $L_d$ 1940. In this example, the ground truth motion kernel $m_t^{GT}$ 1960 may be obtained via a full search 1950 to minimize, for example, the SAD in the reference frame(s) related to the target block 1901 according to the prediction mode.

The second loss 1970 may be a classification loss obtained by calculating a cross entropy between the motion kernel $m_t$ 1920 and the ground truth motion kernel $m_t^{GT}$ 1960. The second loss $L_c$ 1970 may be expressed by, for example, $L_c = C(m_t, m_t^{GT})$.

The training device may train the second network 1910 to minimize the second loss $L_c$ 1970 between the motion kernel $m_t$ 1920 and the ground truth motion kernel $m_t^{GT}$ 1960.

In addition, the training device may train the second network 1910 by considering the first loss $L_d$ 1940 and the second loss $L_c$ 1970 together. The training device may train the second network 1910 so that a loss $L_t$, which is obtained by a weighted sum such as, for example, $L_t = \lambda L_c + L_d$, of the first loss $L_d$ 1940 and the second loss $L_c$ 1970, is minimized. Here, $\lambda$ may correspond to a weight.

Figure 20A:
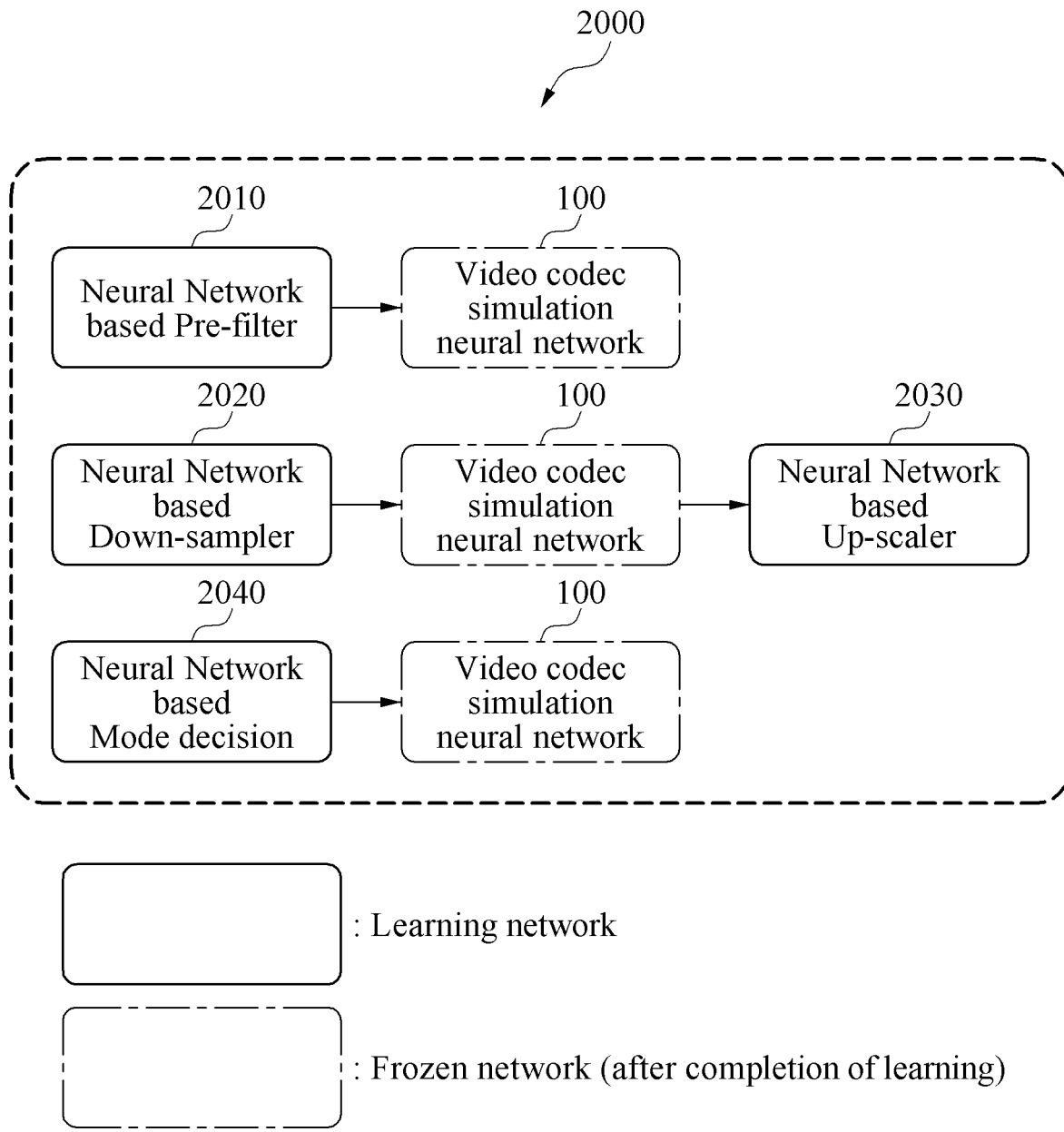
FIGS. 20A and 20B illustrate examples of the use of a neural codec, according to one or more embodiments.
Figure 20B:
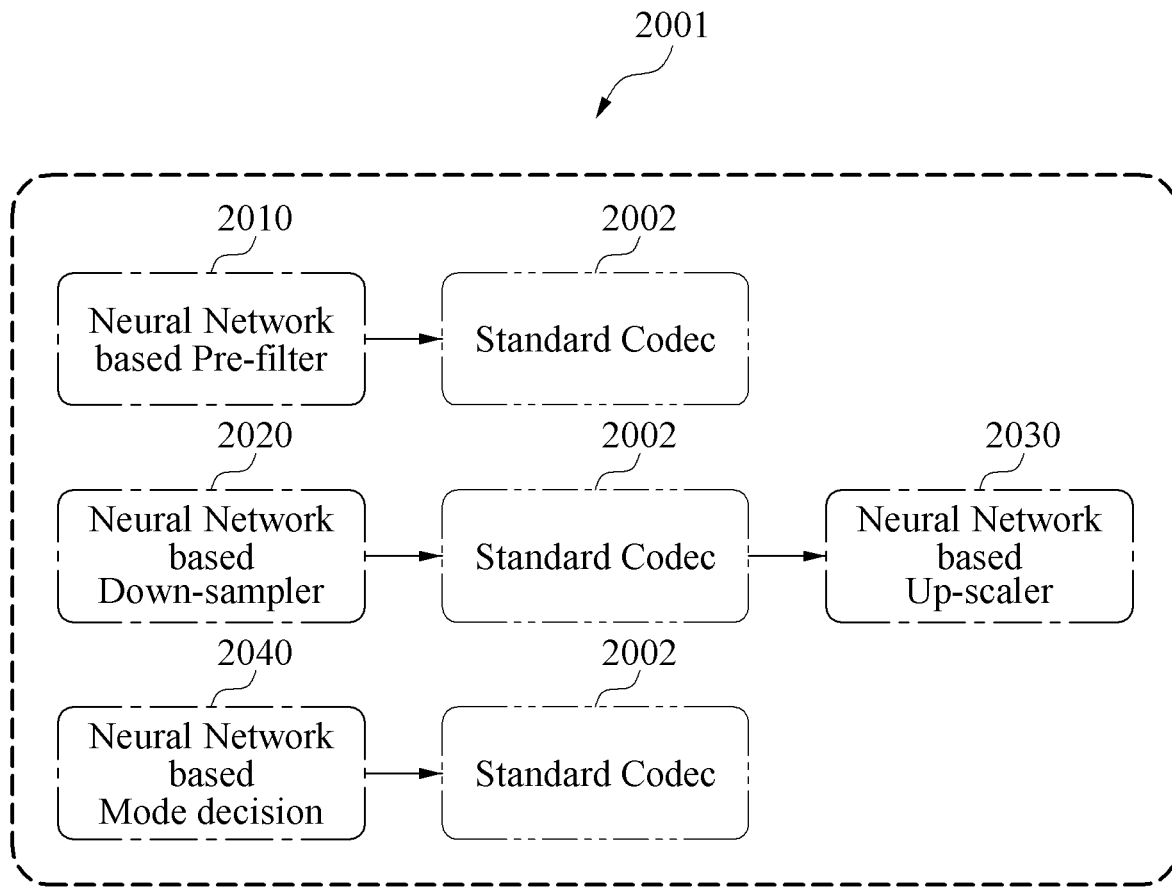
Figure 20B:
Figure 20B:

FIGS. 20A and 20B illustrate examples of the use of a neural codec. Referring to FIG. 20A illustrates an example 2000 in which a neural codec (e.g., the neural codec 300 of FIG. 3) included in the video codec simulation network 100 trains a neural network-based pre-filter 2010, a neural network-based down-sampler 2020, a neural network-based up-scaler 2030, and a neural network-based mode decision network 2040.

FIG. 20B illustrates an example 2001 in which the neural network-based down-sampler 2020, up-scaler 2030, and mode decision network 2040 trained via the method of example 2000 are added to an actual standard codec 2002 and utilized.

The neural network-based pre-filter 2010, the neural network-based down-sampler 2020, the neural network-based up-scaler 2030, and the neural network-based mode decision network 2040 illustrated in FIG. 20A may correspond to a differentiable learning network. In addition, the video codec simulation network 100 including the neural codec 300 may correspond to a network frozen (not further trained) after completion of learning.

In addition, the neural network-based pre-filter 2010, the neural network-based down-sampler 2020, the neural network-based up-scaler 2030, and the neural network-based mode decision network 2040 illustrated in FIG. 20B may correspond to a network frozen after completion of learning. Here, the actual standard codec 2002 may correspond to a non-differentiable module, that is, a non-trainable module.

The neural codec 300 may include, for example, a first network and a second network trained through the process described above with reference to FIGS. 18 and 19. The neural codec 300 may be included in the video codec simulation network 100.

For example, in FIG. 20B, the neural network-based pre-filter 2010 may be added to the front-end of the standard codec 2002. In this example, the video codec simulated neural network 100 may be disposed at the back-end of the neural network-based pre-filter 2010 and used for the learning of the neural network-based pre-filter 2010.

In FIG. 20A, when the neural network-based pre-filter 2010 is trained, end-to-end learning may be performed via the differentiable video codec simulation network 100 including the neural codec 300. When the neural network-based pre-filter 2010 trained in FIG. 20A is added to the front-end of the standard codec 2002 as illustrated in FIG. 20B, the subjective image quality and/or compression rate may be improved.

Alternatively, for scalable video coding (SVC), the neural network-based down-sampler 2020 may be added to the front-end of the standard codec 2002, and/or the neural network-based up-sampler 2030 may be added to the back-end of the standard codec 2002 as illustrated in FIG. 20B. To this end, in FIG. 20A, the video codec simulation network 100 including the neural codec 300 may connect the neural network-based down-sampler 2020 and the neural network-based up-sampler 2030 to help the learning of the neural network-based down-sampler 2020 and the neural network-based up-sampler 2030. The neural codec 300 may be added between the neural network-based down-sampler 2020 and the neural network-based up-sampler 2030.

Alternatively, as illustrated in FIG. 20B, the mode decision network 2040 that optimizes parameters of the standard codec 2002 may be added to the front-end of the standard codec 2002. In order to improve performance through the addition of the mode decision network 2040, the differentiable video codec simulation network 100 including the neural codec 300 may be disposed at the back-end of the mode decision network 2040 and used for the learning of the mode decision network 2040, in FIG. 20A.

The neural codec 300 may correspond to a differentiable network capable of simulating a degradation process of the standard codec 2002 in order to smoothly train the neural network positioned at the input terminal of the standard codec 2002 illustrated in FIG. 20B.

Using the differentiable video codec simulated neural network 100 including the neural codec 300 illustrated in FIG. 20A, the neural network positioned at the input terminal of the standard codec 2002 illustrated in FIG. 20B may be smoothly trained. For smooth learning of the neural network positioned at the input terminal of the standard codec 2002 in FIG. 20B, by freezing the parameters of the differentiable video codec simulation network 100 including the neural codec 300 and passing the gradient during end-to-end training, but not updating the parameters of the video codec simulation network 100 in FIG. 20A, the neural network may become trainable.

The neural network results such as the pre-filter 2010 and the mode decision network 2040 trained by the neural codec 300 included in the video codec simulation network 100 in FIG. 20A may be used as an application or software in an electronic device including a system on chip (SoC), a neural processing unit (NPU), and/or a graphics processing unit (GPU).

The computing apparatuses, the electronic devices, the processors, the memories, the encoders/decoders, the displays, the information output system and hardware, the storage devices, and other apparatuses, devices, units, modules, and components described herein with respect to FIGS. 1-20B are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-20B that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it is apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A neural codec, comprising:
a first simulated predictor configured to predict a first block corresponding to a target block within a current frame, wherein the first block is predicted in accordance with the target block of the to-be-predicted current frame and pixels of neighbor blocks adjacent to the target block being input to the first simulated predictor;
a second simulated predictor configured to predict a second block corresponding to a target block using a reference block of a frame determined based on a prediction mode, wherein the second block is predicted in accordance with the reference block of a reference frame adjacent to the current frame and the target block being input to the second simulated predictor; and
a selection network configured to select, based on the prediction mode, between the first block and the second block as a predicted block.

2. The neural codec of claim 1, wherein the first simulated predictor is configured to generate first candidate blocks by referring to the pixels of the neighbor blocks in the current frame, and
comprises a first network configured to select one of the first candidate blocks as the first block based on a difference between the first candidate blocks and the target block.

3. The neural codec of claim 2, wherein the first simulated predictor is configured to:
generate an intra-frame vector by replicating the pixels of the neighbor blocks in a vertical direction; and
generate the first candidate blocks by a matrix multiplication between the intra-frame vector and predefined intra-frame matrices.

4. The neural codec of claim 2, wherein the first network comprises:
a first classification network configured to output a one-hot-vector indicating one of the first candidate blocks, wherein the one-hot-vector is based on the difference between the first candidate blocks and the target block; and
a first computation module configured to select the first block by performing a channel-wise multiplication between the one-hot-vector and the first candidate blocks.

5. The neural codec of claim 1, wherein the reference block has a size greater than the target block by a size of a search range.

6. The neural codec of claim 1, wherein the second simulated predictor comprises:

a second network configured to generate a motion kernel based on a comparison result between the reference block and the target block; and
a convolution operation module configured to output a candidate area having the highest similarity with the target block among candidate areas of the reference block as the second block, wherein the candidate areas is output based on a convolution operation between the motion kernel and the reference block.

7. The neural codec of claim 6, wherein the second network is configured to generate a latent vector based on the target block and the reference block, and generate the motion kernel according to a size of a search range using the latent vector.

8. The neural codec of claim 7, wherein, in response to the prediction mode being a P-frame prediction mode,
the second network is configured to generate the motion kernel in a one-hot-vector form based on the reference block of the reference frame.

9. The neural codec of claim 7, wherein, in response to the prediction mode being a B-Frame prediction mode,
the reference block comprises reference blocks of a plurality of frames, and
the second network is configured to generate the motion kernel having one or more non-zero values based on the reference blocks.

10. The neural codec of claim 1, wherein the selection network comprises:
a second classification network configured to output one-hot vectors corresponding to probability distributions based on differences between each of the first block and the second block, and the target block; and
a second computation module configured to select one of the first block and the second block as the predicted block by performing a channel-wise multiplication between each of the first block and the second block, and the one-hot-vectors.

11. The neural codec of claim 10, wherein the selection network is configured to,
in response to the prediction mode being the P-frame prediction mode or the B-Frame prediction mode,
output the one block selected from the first block and the second block as the predicted block, and
in response to the prediction mode being an I-frame prediction mode,
output the first block as the predicted block without performing the channel-wise multiplication.

12. The neural codec of claim 1, wherein the reference block comprises a plurality of reference blocks, and
the second simulated predictor is configured to,
generate second candidate blocks having the same size as the target block by unfolding the plurality of reference blocks, and
predict the second block corresponding to the target block by arranging the second candidate blocks in a channel direction and applying the second candidate blocks as an input to a third network, and
the third network is configured to select one of the second candidate blocks as the second block based on a difference between the second candidate blocks and the target block.

13. The neural codec of claim 1, wherein the neural codec is added to a front-end or back-end of a standard codec, and wherein the neural codec enables learning of the standard codec without changing parameters of networks comprised in the neural codec.

14. A neural codec, comprising:
- a first simulated predictor configured to generate first candidate blocks by referring to a target block of a to-be-predicted current frame and pixels of neighbor blocks adjacent to the target block;
- a second simulated predictor configured to generate second candidate blocks having the same size as the target block by unfolding reference blocks of a reference frame adjacent to the current frame;
- a combination module configured to generate combined blocks acquired by concatenating the first candidate blocks and the second candidate blocks; and
- a selection network configured to select one of the combined blocks as a predicted block based on a difference between the combined blocks and the target block.

15. A learning method of a neural codec comprising a first simulated predictor, a second simulated predictor, and a selection network, the learning method comprising:
- training a first network of the first simulated predictor to predict a first block corresponding to a target block within a learning frame, in accordance with the target block of the to-be-predicted learning frame and pixels of neighbor blocks adjacent to the target block being input;
- training a second network of the second simulated predictor to predict a second block corresponding to a target block using a reference block selected based on a prediction mode, in accordance with the reference block of a reference frame adjacent to the learning frame and the target block being input; and
- training the selection network to select one of the first block and the second block as a predicted block based on the prediction mode.

16. The learning method of claim 15, wherein the training of the first network comprises:
- training the first network based on a first loss between the first block, which is selected from among first candidate blocks by a difference between the first candidate blocks generated by referring to the pixels of the neighbor blocks adjacent to the target block and the target block, and the target block.

17. The learning method of claim 16, wherein the training of the first network comprises:
- training the first network to predict the first block by further considering a second loss between a first one-hot-vector output corresponding to any one of the first candidate blocks based on the difference between the first candidate blocks and the target block, and a second one-hot-vector based on a difference between blocks in the learning frame and the target block.

18. The learning method of claim 15, wherein the training of the second network comprises:
- generating a motion kernel according to the prediction mode based on a comparison result between the reference block and the target block; and
- training the second network to predict the second block based on a first loss between candidate areas of the reference block generated through a convolution operation between the motion kernel and the reference block, and the target block.

19. The learning method of claim 18, wherein the training of the second network comprises:
- training the second network to predict the second block by further considering a second loss between the motion kernel generated according to the prediction mode and a ground truth motion kernel corresponding to the target block, based on the comparison result between the target block and the reference block.

20. A non-transitory computer-readable storage medium storing instructions that, when executed by a processor, cause the processor to perform the method of claim 15.

* * * * *